(12) United States Patent
Lauer et al.

(10) Patent No.: US 9,716,542 B2
(45) Date of Patent: Jul. 25, 2017

(54) SYSTEMS AND METHODS FOR FACILITATING COMMUNICATIONS DESTINED FOR A NON-TERRESTRIAL NETWORK

(71) Applicant: GOGO LLC, Itasca, IL (US)

(72) Inventors: Bryan Adrian Lauer, Hinckley, IL (US); Kathy Wang, Buffalo grove, IL (US); Tony LaMarca, Loves Park, IL (US); Paresh Kanabar, Naperville, IL (US); Premkumar Bangole, Bloomingdale, IL (US); Pat Walsh, Naperville, IL (US)

(73) Assignee: GOGO LLC, Chicago, IL (US)

( * ) Notice: Subject to any disclaimer, the term of this patent is extended or adjusted under 35 U.S.C. 154(b) by 138 days.

(21) Appl. No.: 14/292,035

(22) Filed: May 30, 2014

(65) Prior Publication Data

US 2015/0349875 A1    Dec. 3, 2015

(51) Int. Cl.
*H04B 7/185* (2006.01)
*H04W 4/14* (2009.01)
(Continued)

(52) U.S. Cl.
CPC ..... *H04B 7/18506* (2013.01); *H04L 65/1006* (2013.01); *H04L 65/1069* (2013.01);
(Continued)

(58) Field of Classification Search
None
See application file for complete search history.

(56) References Cited

U.S. PATENT DOCUMENTS

| 5,546,397 A | 8/1996 | Mahany |
| 5,557,656 A | 9/1996 | Ray et al. |

(Continued)

FOREIGN PATENT DOCUMENTS

| EP | 0 902 551 A2 | 3/1999 |
| EP | 1 976 152 A1 | 10/2008 |

(Continued)

OTHER PUBLICATIONS

"3rd Generation Partnership Project: Technical Specification Group Core Network and Terminals: Support of SMS over IP networks; Stage 3 (Release 12)", 3GPP Standard; 3GPP TS 24.341, 3rd Generation Partnership Project Mobile Competence Centre, (Dec. 19, 2013).

(Continued)

*Primary Examiner* — Kouroush Mohebbi
(74) *Attorney, Agent, or Firm* — Marshall, Gerstein & Borun LLP; Randall G. Rueth

(57) ABSTRACT

Embodiments are provided for facilitating text- and voice-based communications that are destined for an electronic device connected to a non-terrestrial network. According to certain aspects, the electronic device can be previously registered with a data center and can have an active service or product with the data center. A data center receives a communication request that is intended for the electronic device. The data center examines the communication request to identify the electronic device, and modifies the communication request to indicate an identification of the electronic device. The data center transmits the modified communication request to an on-board communications network system for delivery to the destination device.

16 Claims, 10 Drawing Sheets

(51) Int. Cl.
*H04L 29/06* (2006.01)
*H04L 29/08* (2006.01)

(52) U.S. Cl.
CPC .............. *H04L 67/12* (2013.01); *H04L 69/22* (2013.01); *H04W 4/14* (2013.01)

(56) References Cited

U.S. PATENT DOCUMENTS

| | | |
|---|---|---|
| 5,652,795 A | 7/1997 | Dillon et al. |
| 5,699,384 A | 12/1997 | Dillon |
| 5,722,074 A | 2/1998 | Muszynski |
| 5,740,366 A | 4/1998 | Mahany et al. |
| 5,844,893 A | 12/1998 | Gollnick et al. |
| 5,940,771 A | 8/1999 | Gollnick et al. |
| 5,995,725 A | 11/1999 | Dillon |
| 5,995,726 A | 11/1999 | Dillon |
| 5,995,833 A | 11/1999 | Zicker |
| 6,009,328 A | 12/1999 | Muszynski |
| 6,016,388 A | 1/2000 | Dillon |
| 6,125,184 A | 9/2000 | Dillon et al. |
| 6,131,160 A | 10/2000 | Dillon et al. |
| 6,161,141 A | 12/2000 | Dillon |
| 6,310,582 B1 | 10/2001 | Uetake et al. |
| 6,374,311 B1 | 4/2002 | Mahany et al. |
| 6,665,536 B1 | 12/2003 | Mahany |
| 6,697,415 B1 | 2/2004 | Mahany |
| 6,714,559 B1 | 3/2004 | Meier |
| 6,788,935 B1 | 9/2004 | McKenna et al. |
| 7,013,138 B2 | 3/2006 | Mahany |
| 7,062,268 B2 | 6/2006 | McKenna |
| 7,107,062 B2 | 9/2006 | Cruz et al. |
| 7,386,002 B2 | 6/2008 | Meier |
| 7,457,646 B2 | 11/2008 | Mahany et al. |
| 7,535,921 B2 | 5/2009 | Meier |
| 7,536,167 B2 | 5/2009 | Gollnick et al. |
| 7,548,553 B2 | 6/2009 | Meier |
| 7,558,569 B2 | 7/2009 | Chang et al. |
| 7,636,552 B2 | 12/2009 | Monk |
| 7,702,328 B2 | 4/2010 | Lemond et al. |
| 7,710,907 B2 | 5/2010 | Mahany |
| 7,751,814 B2 | 7/2010 | Cruz et al. |
| 7,873,343 B2 | 1/2011 | Gollnick et al. |
| 7,916,747 B2 | 3/2011 | Meier |
| RE42,536 E | 7/2011 | Leuca et al. |
| 8,068,829 B2 | 11/2011 | Lemond et al. |
| 8,078,163 B2 | 12/2011 | Lemond et al. |
| 8,094,605 B2 | 1/2012 | Lynch et al. |
| 8,169,946 B2 | 5/2012 | Lynch et al. |
| 8,280,309 B2 | 10/2012 | Monk |
| 8,452,276 B2 | 5/2013 | Lauer |
| 2002/0170060 A1 | 11/2002 | Lyman |
| 2003/0073440 A1* | 4/2003 | Mukherjee .............. H04L 12/58 455/435.1 |
| 2004/0142658 A1 | 7/2004 | McKenna et al. |
| 2006/0229070 A1 | 10/2006 | de La Chapelle et al. |
| 2007/0021117 A1 | 1/2007 | McKenna et al. |
| 2007/0042772 A1 | 2/2007 | Salkini et al. |
| 2008/0004016 A1 | 1/2008 | Smee et al. |
| 2008/0133705 A1 | 6/2008 | Lemond et al. |
| 2008/0182573 A1 | 7/2008 | Lauer et al. |
| 2009/0274097 A1* | 11/2009 | Budinger ........... H04B 7/18506 370/328 |
| 2009/0286517 A1 | 11/2009 | Muirhead |
| 2011/0059738 A1* | 3/2011 | Waller .................... H04W 8/26 455/433 |
| 2011/0265128 A1 | 10/2011 | Bengeult et al. |
| 2012/0131330 A1* | 5/2012 | Tonsing .............. H04L 63/1408 713/153 |

FOREIGN PATENT DOCUMENTS

| | | |
|---|---|---|
| EP | 2 568 533 A1 | 3/2013 |
| GB | 2310973 | 9/1997 |
| WO | WO-00/76087 | 12/2000 |
| WO | WO-01/41317 A2 | 6/2001 |
| WO | WO-2007/120921 A2 | 10/2007 |
| WO | WO-2011/128833 | 10/2011 |

OTHER PUBLICATIONS

Kaji et al., TLS Handshake Method Based on SIP, pp. 467-475, Proc. Intl. Multiconference Computer Sci. Info. Tech., downloaded from the Internet at <http://www.proceedings2006.imcsit.org/pliks/89.pdf> (retrieved on Aug. 10, 2015).
International Search Report and Written Opinion, International Application No. PCT/US2015/033306, mailed Aug. 24, 2015.
"Aero Mobile Terminals: Models 2540/2532" Product Sheet, ViaSat, 2 pp. (2012).
"Direcway™ DW3000/DW4000 Series Systems: Satisfying the Need for Speed for the Multimedia Internet," Hughes Network Systems, 2 pp. (Jun. 2001).
"Exede® Internet: Fastest In-Flight Wi-Fi Unleash the Internet," ViaSat, 4 pp. (2012).
"Gogo Partners with AeroSat to Bring Ku-Satellite Service to Market," Gogo LLC, 2 pp. (May 18, 2012).
"Hughes and ThinKom Demonstrate New Tactical Communications Solutions," press release, Hughes Network Systems, LLC, 2 pp. (Oct. 25, 2012).
"Hughes HX200 Broadband Satellite Router," Hughes Network Systems, LLC, 2 pp. (2012).
ETSI Technical Specification 102 441 (v1.1.1), "Digital Video Broadcasting (DVB); DVB-S2 Adaptive Coding and Modulation for Broadband Hybrid Satellite Dialup Applications", European Telecommunications Standards Institute (ETSI), European Broadcasting Union, 23 pp. (2005).
European Standard 301 195 (v1.1.1), "Digital Video Broadcasting (DVB); Interaction channel through the Global System for Mobile communications (GSM)," European Telecommunications Standards Institute (ETSI), 14 pp. (Feb. 1999).
European Telecommunication Standard (ETS 300 801), "Digital Video Broadcasting (DVB); Interaction channel through Public Switched Telecommunications Network (PSTN) / Integrated Services Digital Networks (ISDN)," European Telecommunications Standards Institute (ETSI), 14 pp. (Aug. 1997).

* cited by examiner

SYSTEMS AND METHODS FOR FACILITATING COMMUNICATIONS DESTINED FOR A NON-TERRESTRIAL NETWORK

FIELD

The present disclosure generally relates to non-terrestrial communications and, in particular, to systems, methods, and techniques for facilitating cellular-based communications destined for an electronic device while connected to a non-terrestrial communication network.

BACKGROUND

Currently, existing airlines and other transportation companies provide various services to mobile or wireless devices (e.g., cellular phones, smart devices, laptops, tablet computers, etc.) when such devices are on-board a vehicle while the vehicle is en route to a destination. However, the delivery of terrestrial or native features (e.g., roaming, texting, simultaneous calls, etc.) to mobile or wireless devices while a vehicle is in transit presents difficulties. Typically, to support native, terrestrial features of a mobile or wireless device in a non-terrestrial environment, cellular base stations such as "picocells" are installed on-board the vehicle, and the mobile device connects, via the cellular radio of the mobile device and the on-board cellular base stations, to an on-board network. In some cases, hardware in addition to the cellular base stations is also installed on-board the vehicle. This extraneous infrastructure is both limiting and extremely expensive. Moreover, the radio transmissions produced on-board the vehicle may interfere with ground-based cellular systems. For example, if mobile devices on-board the vehicle cannot find an adequate cellular band to which they may connect (e.g., when on-board cellular base stations are deactivated), the mobile devices will automatically increase their power, which may interfere with ground-based terrestrial cell sites as well as quickly drain the batteries of the mobile devices.

Some existing terrestrial communications systems are able to provide internet-based network connections to mobile devices while on-board a vehicle. For example, some communications systems are equipped with Wi-Fi capability that enables the mobile devices to access websites and stream multimedia. However, these communications systems are not able to provide mobile devices with terrestrial or native communication features (i.e., cellular-based communications) while the mobile devices are on-board the vehicle.

Accordingly, there is an opportunity to leverage existing communications infrastructure to facilitate cellular-based communications via electronic devices while the electronic devices are connected to a non-terrestrial communications network.

SUMMARY

In an embodiment, a method of processing communication requests intended for a destination electronic device connected to an on-board communications network is provided. The method includes receiving a communication request that is (1) initiated by an electronic device connected to a terrestrial network and (2) intended for the destination electronic device, the communication request comprising a subscription identification associated with the destination electronic device. The method further includes using, by a processor, the subscription identification to identify an identification of the destination electronic device, modifying, by the processor, the communication request to indicate the identification of the destination electronic device, and transmitting, to the on-board communications network for delivery to the destination electronic device, a communication according to the communication request that was modified.

In another embodiment, a system for processing communication requests intended for a destination electronic device connected to an on-board communications network is provided. The system includes a communication module configured to send and receive data and a data center communicatively connected to the communication module. The data center is configured to receive, via the communication module, a communication request that is (1) initiated by an electronic device connected to a terrestrial network and (2) intended for the destination electronic device, the communication request comprising a subscription identification associated with the destination electronic device. The data center is further configured to use the subscription identification to identify an identification of the destination electronic device, modify the communication request to indicate the identification of the destination electronic device, and transmit, to the on-board communications network via the communication module for delivery to the destination electronic device, a communication according to the communication request that was modified.

DETAILED DESCRIPTION

Figure 1:
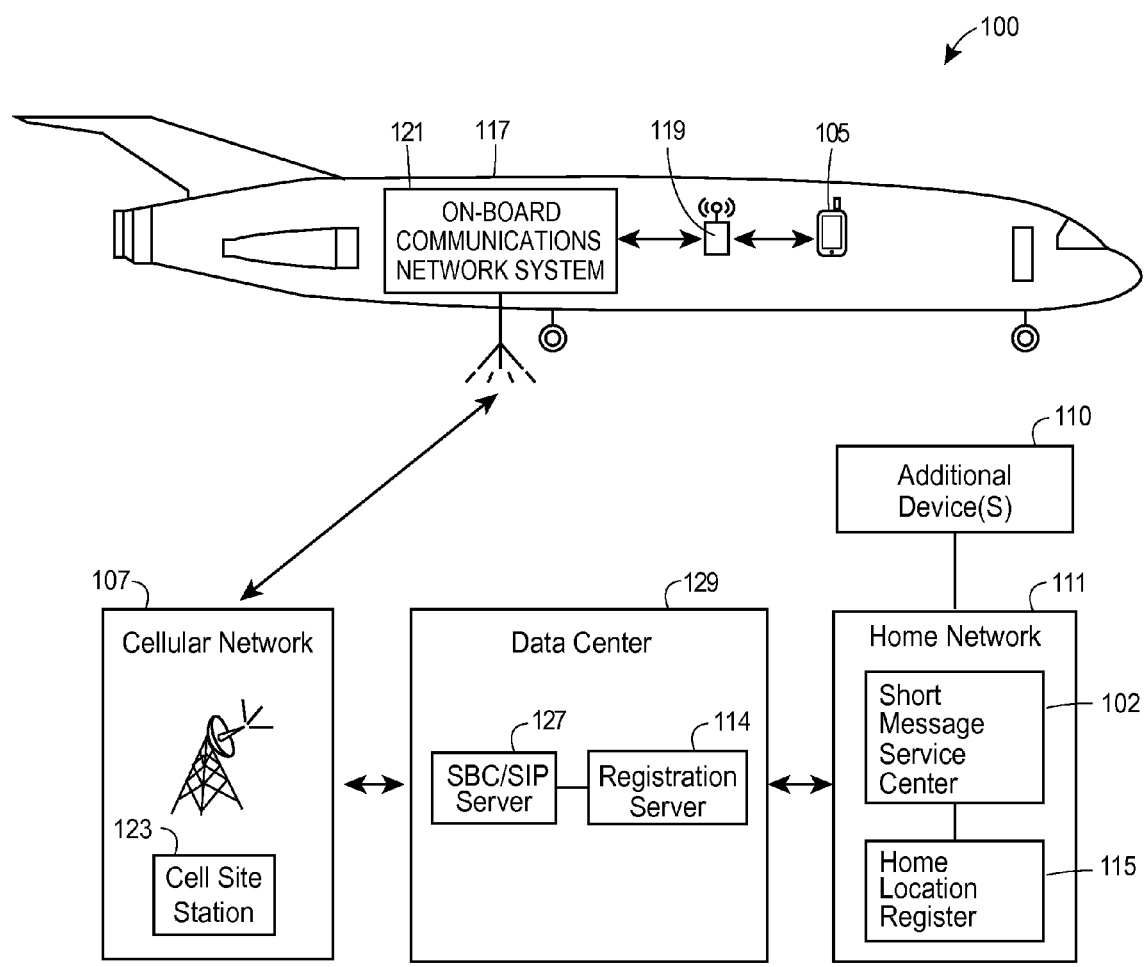
FIG. 1 illustrates an exemplary representation of electronic devices and components capable of facilitating text-based communications among electronic devices, in accordance with some embodiments.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

The systems and methods as discussed herein offer an efficient and effective technique for facilitating text- and voice-based communications among electronic devices. In particular, one of the electronic devices that participates in the communication is connected to a non-terrestrial network (e.g., an air-borne network) and another of the electronic devices that participates in the communication is connected to a terrestrial network (e.g., a ground-based network). The systems and methods enable non-terrestrial electronic devices to roam in a cellular-based network, send and receive text messages (e.g., SMS messages), and originate and terminate voice calls while the electronic devices are connected to a wireless network on a vehicle such as an airplane. The systems and methods facilitate the resulting cellular-based communications as if the electronic devices are roaming in a cellular environment. Thus, the telephone numbers (or other subscription identifications) associated with the non-terrestrial devices are provided to terrestrial devices so as to provide full transparency to the users of the terrestrial devices. For example, a receiving party's smart phone will display the telephone number of an in-air smart phone upon receipt of a voice call initiated by the in-air smart phone.

As a result, the systems and methods enable "feature transparency," which generally refers to providing features that are native to or provided at wireless devices in a terrestrial environment (e.g., while the wireless devices are being serviced by cell sites or wireless access points that are connected to a structure that is physically and fixedly connected to the ground), to the wireless devices when the wireless devices are in a non-terrestrial environment, (e.g., while the wireless devices are being serviced by wireless access points that are connected to a structure that is fixedly connected to a vehicle), such as while the wireless or mobile device is being transported by an aircraft in flight or by a sailing boat.

The systems and methods may be facilitated by a back-end registration server as well as a communication application installed on an electronic device. During a registration of an electronic device with the registration server, the registration server sends a location update for the electronic device to the home network of a user of the electronic device and the home network updates its home location register (HLR) accordingly. Therefore, the location of the electronic device is known within the terrestrial mobile network and the electronic device is configured to roam, as well as send and receive text messages and voice calls using the native subscription information.

In certain aspects, a user interacts with the registered electronic device to initiate sending a text- or voice-based communication to a destination device. The electronic device initiates the communication by sending an internet-based message to the registration server, which locates an account for the electronic device and performs other functionalities based on the received message. If the initial communication is a text-based communication, the registration server delivers the message to the destination device via a home network of the electronic device. If the initial communication is a voice-based communication, the registration server communicates with a session initiation protocol (SIP) trunk provider to establish a stream between the electronic device and the destination device via which voice communications may be facilitated.

In some embodiments, the device that is connected to a terrestrial-based network can initiate a text- or voice-based communication that is intended for the electronic device located in the non-terrestrial environment. In this case, the registration server may receive an associated communication and modify the communication with identification information associated with the electronic device. If the initial communication is a text-based communication, the registration server sends the communication to the on-board communications system for delivery to the electronic device. If the initial communication is a voice-based communication, the registration server facilitates an SIP-based invite to the electronic device that initiates a stream between the electronic device and the destination device via which voice communications may be facilitated.

The systems and methods offer numerous advantages and benefits. In particular, the systems and methods enable an electronic device to send and receive cellular-based communications while the electronic device is not connected to a cellular-based network, thus increasing user availability and general communications capability. Further, the systems and methods enable a service provider to provide electronic devices with access to cellular-based connectivity, thus serving as a source of revenue generation. Additionally, the registration of the electronic device with the registration server provides the subscriber with added security as well as limiting instances of "spoofing." It should be appreciated that other advantages and benefits of the systems and methods are envisioned.

FIG. 1 illustrates an example representation 100 of components configured to facilitate cellular-based communications among electronic devices. In particular, the components of the representation 100 are configured to facilitate text-based communications (e.g., short message service (SMS) messages) between an electronic device 105 connected to a non-terrestrial-based network and one or more additional devices 110 connected to a terrestrial-based network. Generally, as referred to herein, a "terrestrial-based" or "ground-based" network refers to any network that electronic devices may connect to while in a terrestrial environment, but may not easily communicate while being transported by a high-speed or high-elevation vehicle such as an airplane. Similarly, a "non-terrestrial-based" or "non-ground-based" network refers to any network that electronic devices may connect to while not in range of a ground-based network or while not able to easily connect to a ground-based network, such as while the electronic devices are being transported by a high-speed or high-elevation vehicle such as an airplane. Generally, the external network includes ground systems and ground computing devices that are essentially fixed in location. Further, the external network includes base stations or infrastructure containing equipment via which devices may wirelessly access the external network may be contained in one or more buildings or other structures that are fixedly attached to the ground or to earth.

Each of the electronic device 105 and the additional device 110 may be any type of standalone or portable electronic device capable of communicating via one or more networks. For example, each of the electronic device 105 and the additional device 110 may be a mobile phone, a Personal Digital Assistant (PDA), a smart phone, a tablet computer, a multimedia player, a desktop or notebook computer, an MP3 player, a digital broadcast receiver, or any other electronic apparatus. Each of the electronic device 105 and the additional device 110 may also have a subscription or plan with a cellular services provider, whereby the cellular services provider supports cellular communications conducted via the electronic device 105 and/or the additional device 110.

As illustrated in FIG. 1, the electronic device 105 is transported by or otherwise located within a vehicle 117. In embodiments, the vehicle 117 may be owned and/or operated by an individual, or the vehicle may be owned and/or operated by a company, organization or governmental entity. The vehicle 117 may be one of a fleet of vehicles. The vehicle 117 may be used to transport passengers who pay for or otherwise are granted passage on the vehicle. The vehicle 117 may be used to transport executives or staff of a company or organization and their guests. The vehicle 117 may be used to transport live or inanimate cargo, packages, mail, and/or other types of passengers or cargo. Furthermore, although FIG. 1 depicts the vehicle 117 as an aircraft, the techniques and principles described herein equally apply to other types of vehicles such as trucks, automobiles, busses, trains, boats, ships, barges, subway cars, helicopters, ambulances or other emergency vehicles, military vehicles, other air-borne, water-borne, or land-borne vehicles, and vehicles that are suitable for space travel.

The vehicle 117 is equipped with a wireless access point 119 and an on-board communications network system 121. At any given moment in time, the on-board communications network system 121 may be in communicative connection with one or more data or communications networks that are disposed, managed, and/or hosted, for the most part (if not entirely), externally to the vehicle 117. For example, an external network may be a public, ground-based data or communications network, such as the Internet and/or the PSTN (Public Switched Telephone Network). The external network may also be a ground-based private data and/or communications network. Further, the external network may be a cellular network 107 that includes a cell site station 123. Generally, the external network includes ground systems and ground computing devices that are essentially fixed in location. Further, the external network includes base stations or infrastructure containing equipment via which devices may wirelessly access the external network may be contained in one or more buildings or other structures that are fixedly attached to the ground or to earth.

The electronic device 105 can connect to the on-board communications network system 121 via the wireless access point 119. Generally, the on-board communications network system 121 may be disposed, managed, and/or hosted entirely on-board the vehicle 117. For example, the on-board communications network system 121 may be a Wi-Fi network that is contained and operates within the cabin of the vehicle 117. The on-board communications network system 121 may utilize any known communication protocol or combinations thereof, such as a wireless protocol, a wired protocol, other ARINC standard-compatible protocols, or a private protocol. In an example, the on-board communications network system 121 utilizes an IEEE 802.11 compatible protocol to communicate with the electronic device 105. In another example, the on-board communications network system 121 utilizes a hypertext transfer protocol (HTTP) and a Near Field Communications (NFC)-compatible protocol (e.g., Bluetooth®) to communicate with the electronic device 105.

The on-board communications network system 121 can also facilitate and manage communications between the electronic device 105 and the cell site station 123 of the cellular network 107. According to embodiments, the on-board communications network system 121 and the cell site station 123 may collectively make up an air-to-ground (ATG) communication network for aircraft use. In embodiments, the on-board communications network system 121 and the cell site station 123 can facilitate any type of data communication via any wireless standard or technology (e.g., GSM, CDMA, TDMA, WCDMA, LTE, EDGE, OFDM, GPRS, EV-DO, UWB, and others).

The cell site station 123 of the cellular network 107 can connect, via one or more various wired or wireless networks, to a ground-based data center 129 having components for securely facilitating communications between the electronic device 105 and other electronic devices, such as the additional device 110. In particular, the cell site station 123 includes a session border controller (SBC) and session initiation protocol (SIP) server 127 (which may be separate servers or combined into the same server) and a registration server 114. The registration server 114 may be any combination of hardware and software elements configured to directly or indirectly communicate with the electronic device 105 and the additional device 110, and facilitate the functionalities and communications described herein. Further, the SBC/SIP server 127 can facilitate and manage communication sessions among the electronic device 105, the additional device(s) 110, and the data center 129 using the SIP signaling communications protocol.

Although the embodiments herein are described as operating with the SIP signaling protocol, it should be appreciated that other standard or proprietary application protocols are envisioned. For example, other envisioned protocols include hypertext transfer protocol (HTTP), simple mail transfer protocol (SMTP), transmission control protocol (TCP), user datagram protocol (UDP), Internet control message protocol (ICMP), internet message access protocol (IMAP), and others.

According to embodiments, the electronic device 105 can download and install a communication application (not shown in FIG. 1) that enables cellular-based communications when the electronic device 105 is located in the vehicle 117. Further, the electronic device 105 can use the communication application to register and create an account with the registration server 114, to enable the electronic device 105 to communicate over various air-borne communication networks, such as an air-to-ground (ATG) communication network for aircraft use.

As illustrated in FIG. 1, the registration server 114 may connect, via a cellular-based network, to a home network 111 associated with the electronic device 105. The cellular-based network may be a wide area network (WAN) configured to facilitate any type of data communication via any standard or technology (e.g., GSM, CDMA, TDMA, WCDMA, LTE, EDGE, OFDM, GPRS, EV-DO, UWB, and others). Generally, the home network 111 of the electronic device 105 may be administered or provided by a cellular communications service provider with which the user (i.e., subscriber) of the electronic device 105 has an agreement to send and receive wireless communications services and features. Accordingly, the home network 111 of the electronic device 105 may administrate or manage a home location register (HLR) 115 and/or a visiting location register (VLR) (not shown in FIG. 1), among other databases or components, to support and manage cellular communication, roaming, and other features for the electronic device 105 according to the services agreement. Additionally, the cellular radio frequency (RF) communications band utilized by the home network 111 to wirelessly communicate with mobile devices may be an RF band designated for AMPs, TDMA, CDMA, GSM, PCS, 3G, 4G, 5G, and/or any other terrestrial cellular radio frequency band. Generally, a cellular radio frequency band is a portion of RF spectrum that is allocated by a governmental agency or other body which governs the usage of spectrum. In some networks, more than one cellular RF band may be supported.

The HLR 115 can include a database that stores identifications of electronic devices that are authorized to communicate via the home network 111. In particular, for each authorized device, the HLR 115 can store the corresponding international mobile subscriber identity (IMSI), which is a unique number that identifies each authorized device (or more particularly, identifies the SIM card of each authorized device). The HLR 115 can also pair each IMSI with a mobile subscriber integrated services digital network number (MSISDN) that corresponds to a telephone number of the authorized device. The home network 111 further includes a short message service center (SMSC) 102 configured to store, forward, convert, and deliver cellular-based messages (e.g., text messages such as SMS messages). In particular, the SMSC 102 can forward, to the data center 129, messages originated by the additional device 110 and intended for the electronic device 105. Further, the SMSC 102 can send, to the additional device 110, messages received from the electronic device 105 via the data center 129.

According to embodiments, the components of the representation 100 are configured to facilitate the communication of cellular-based messages between and among the electronic device 105 and the one or more additional devices 110. In one embodiment, the data center 129 can receive, via the on-board communications network system 121 and the cellular network 107, a message from the electronic device 105 traveling in the vehicle 117, whereby the message is intended for the additional device 110. Because the message is initiated as an internet-based communication, the message is not configured for delivery to the additional device 110 as a conventional cellular-based message. Accordingly, the data center 129 can perform various techniques associated with the message so that the message is configured to be delivered, via the home network 111, to the additional device 110 as a conventional cellular-based message.

In another embodiment, the data center 129 can receive a message from the additional device 110 via the home network 111, whereby the message is intended for the electronic device 105 traveling in the vehicle 117. Because the message is initiated as a cellular-based communication, the message is not configured for delivery to the electronic device 105 because the electronic device 105 is not directly connected to a cellular-based network. Accordingly, the data center 129 can perform various techniques associated with the message so that the message is configured to be delivered, via the cellular network 107 and the on-board communications network system 121, to the electronic device 105 as an internet-based message.

Figure 2:
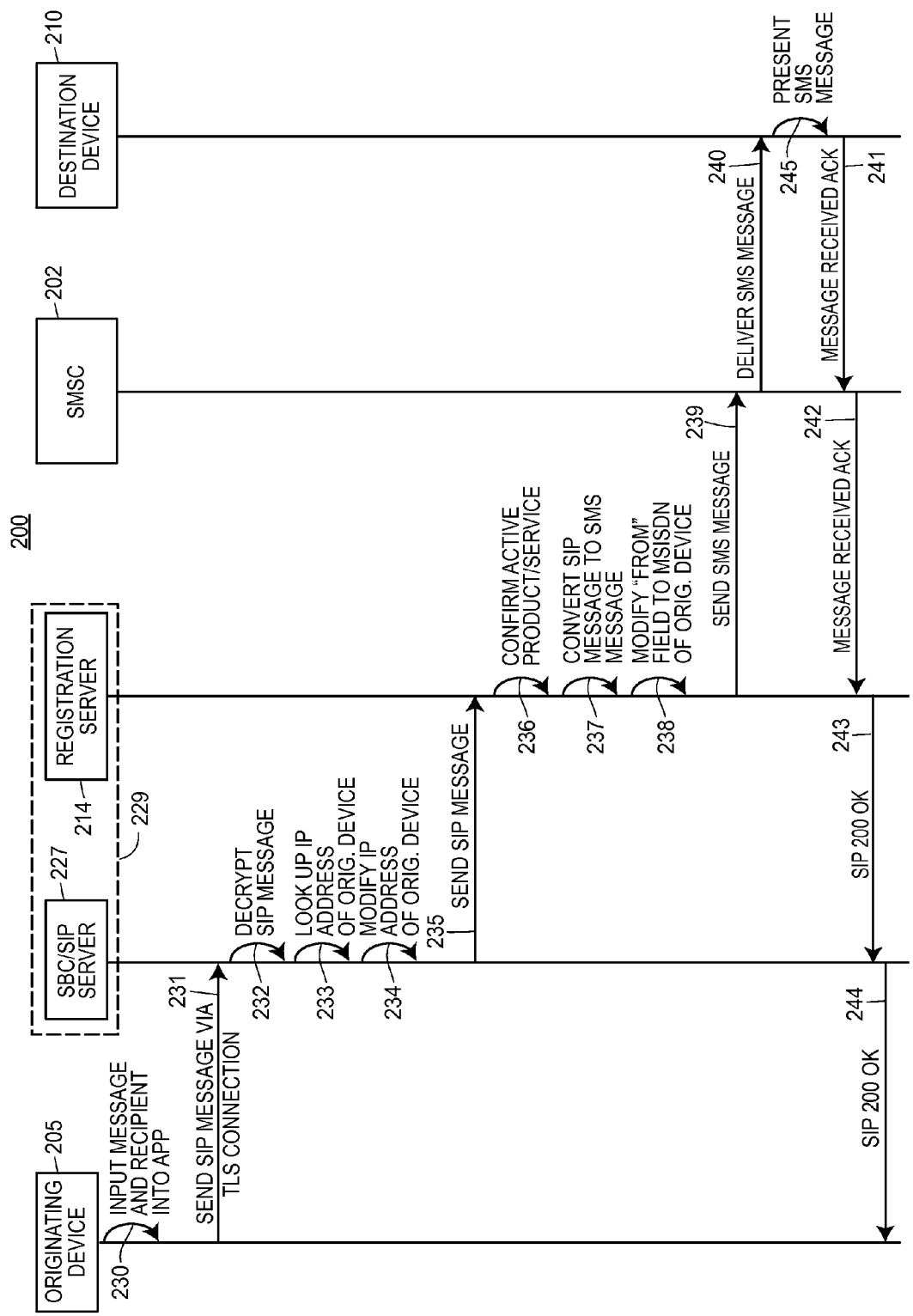
FIG. 2 depicts an example signal diagram associated with facilitating a text-based communication that originates from an electronic device connected to a non-terrestrial network, in accordance with some embodiments.

FIG. 2 illustrates a signal diagram 200 associated with facilitating the communication of a text-based communication or message that originates from an origination device 205 connected to a non-ground-based network, such as if the origination device 205 is located on board a vehicle such as an aircraft. According to embodiments described herein, the text-based communication can be an SMS message, however it should be appreciated that other text-based or multimedia-based communications are envisioned. The signal diagram 200 includes the originating device 205 (such as the electronic device 105 as discussed with respect to FIG. 1), a data center 229 including an SBC/SIP server 227 (such as the SBC/SIP server 127 as discussed with respect to FIG. 1) and a registration server 214 (such as the registration server 114 as discussed with respect to FIG. 1), an SMSC 212 (such as the SMSC 112 as discussed with respect to FIG. 1), and a destination device 210 (such as the destination device 110 as discussed with respect to FIG. 1).

According to embodiments, a user of the originating device 205 may select a service or product from a list of available services or products that may include various cellular connectivity options for the originating device 205 that are based on time durations, data limits, or other parameters. For example, the list of services or products can include an option to send and receive unlimited text-based communications during a particular flight.

To initiate the communication of the text-based message, a user can use the originating device 205 to input (230) the message body and an identification of the recipient. In particular, the identification of the recipient can be an MSIDSN (i.e., telephone number) associated with the destination device 210. In some embodiments, the user can initiate the message using a communication application that has already been registered with an on-board communications network system of the vehicle and/or with the registration server 214. Further, the communication application can convert the text-based message into an SIP-based message, whereby the SIP message includes a uniform resource indicator (URI) that indicates the IMSI and/or MSISDN associated with the originating device 205.

Although not illustrated in FIG. 2, the originating device 205 can initiate a transport layer security (TLS) connection with the SBC/SIP server 427 using a digital certificate. In particular, the certificate can be the certificate that the registration server 214 issues to the originating device 205 during the device registration technique. The registration server 214 (acting as the certificate authority (CA)) can validate the certificate and send a success response to the SBC/SIP server 227. Responsive to receiving the success response, the SBC/SIP server 227 can establish the TLS connection with the originating device 205.

The originating device 205 can send (231) the SIP message to the SBC/SIP server 227 via the established TLS connection. The SBC/SIP server 227 can decrypt (232) the SIP message and look up (233) the IP address associated with the originating device 205. In particular, the IP address can be a care-of address (CoA) that the SBC/SIP server 227 has previously associated with the originating device 205. The SBC/SIP server 227 can modify (234) the IP address of the originating device 205 by replacing the IP address included in the SIP message with the CoA associated with the originating device 205.

After modifying the IP address, the SBC/SIP server 227 can send (235) the SIP message with the modified IP address to the registration server 214. The registration server 214 can examine the SIP message and confirm (236) that the originating device 205 has an active product or service. The registration server 214 can also convert (237) the SIP message into an SMS message according to the proper communication protocol (e.g., GSM, CDMA, etc.). Further, the registration server 214 can modify (238) the "from" field of the SMS message to the MSISDN of the originating device 205. In particular, the registration server 214 can use the identification of the originating device 205 that is specified in the SIP message (e.g., the IMSI of the originating device 205) to look up the MSISDN of the originating device 205.

After generating the SMS message, the registration server 214 can send (239) the SMS message to the SMSC 202, and the SMSC 202 can deliver (240) the SMS message to the destination device 210. When the destination device 210 receives the SMS message, the MSISDN included in (238) will enable the SMS message to appear as a conventional cellular-based SMS, instead of a message that originates as an SIP message as in (231). In particular, the appearance of the delivered SMS does not differ from the appearance of an SMS message that is sent from one mobile device to another mobile device via a cellular network.

Upon receiving the SMS message from the SMSC 202, the destination device 210 can present (245) the SMS message in a user interface. In some embodiments, the destination device 210 can present the body or textual portion of the SMS message via an application installed on the destination device 210. Further, the destination device 210 can send (241) a message received acknowledgement to the SMSC 202, which can be respectively forwarded to the registration server 214 (242), to the SBC/SIP server 227 (243), and to the originating device 205 (244).

Figure 3:
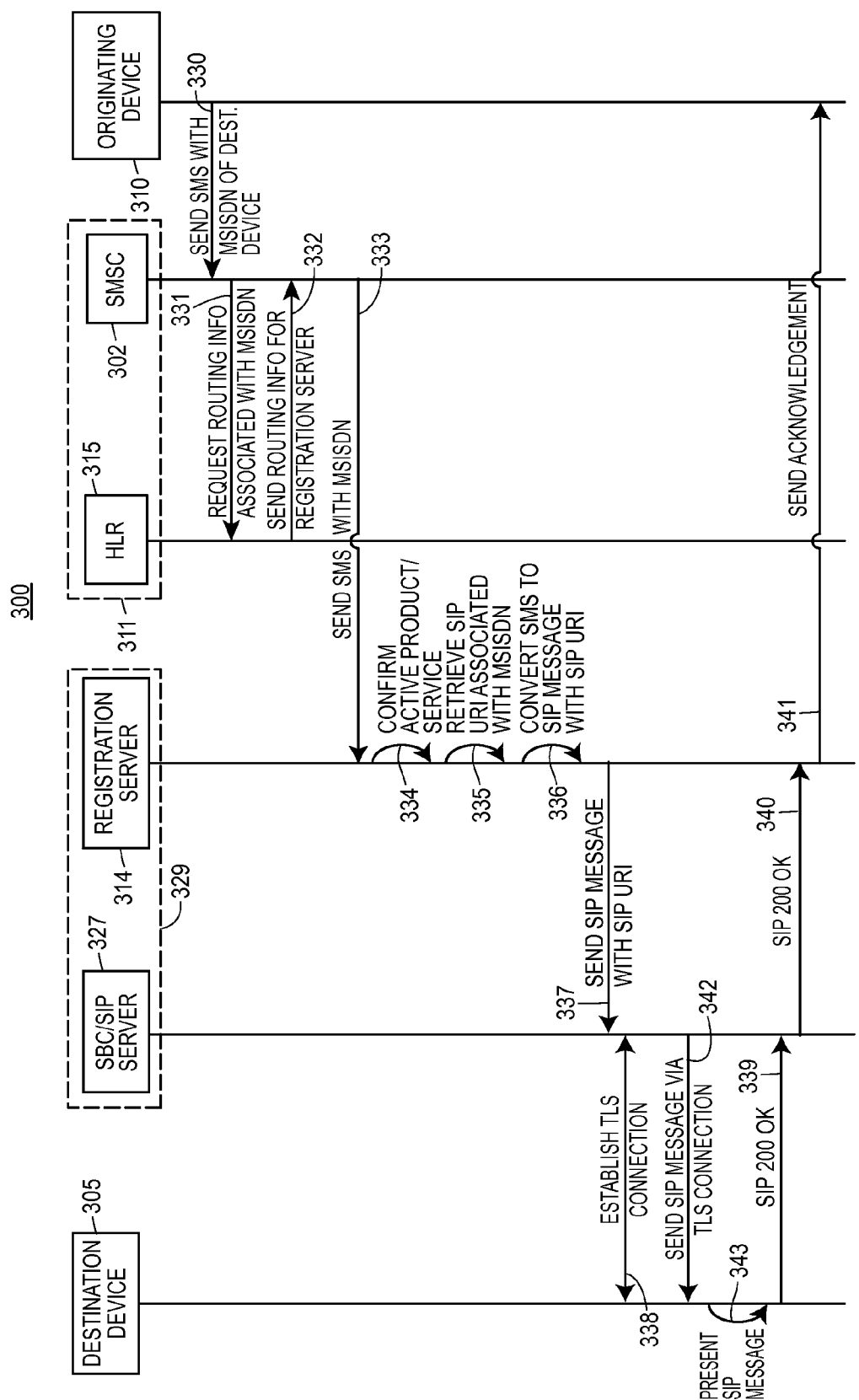
FIG. 3 depicts an example signal diagram associated with facilitating a text-based communication that is intended for an electronic device connected to a non-terrestrial network, in accordance with some embodiments.

FIG. 3 illustrates a signal diagram 300 associated with facilitating the delivery of a text-based communication or message that originates from an originating device 310 connected to a terrestrial-based network. Further, the text-based communication is intended for a destination device 305 that is connected to a non-terrestrial-based network, such as if the destination device 305 is located on board a vehicle such as an aircraft. According to embodiments described herein, the text-based communication can be an SMS message, however it should be appreciated that other text-based or multimedia-based communications are envisioned. The signal diagram 300 includes the destination device 305 (such as the electronic device 105 as discussed with respect to FIG. 1), a data center 329 including an SBC/SIP server 327 (such as the SBC/SIP server 127 as discussed with respect to FIG. 1) and a registration server 314 (such as the registration server 114 as discussed with respect to FIG. 1), a home network 311 including an HLR 315 and an SMSC 312 (such as the HLR 115 and the SMSC 112 as discussed with respect to FIG. 1), and the originating device 310 (such as the additional device 110 as discussed with respect to FIG. 1). For purposes of discussion, it should be appreciated that the destination device 305 has already completed the registration procedure with the registration server 314, and has also purchased a product or service that enables text-based communication via the non-terrestrial-based network.

To initiate the communication of the text-based message, a user can use the originating device 310 to compose the SMS message (e.g., using a conventional text messaging application), specify the recipient (e.g., via including the MSISDN of the destination device 305), and select to send the SMS message. In operation, the originating device 310 sends (330) the SMS message to the SMSC 302. Upon receiving the SMS message, the SMSC 302 requests (331), from the HLR 315 associated with the destination device 305, routing information associated with the MSISDN specified in the SMS message. Because the destination device 305 has previously registered with the registration server 314, the registration server 314 previously updated the location of the destination device 305 with the HLR 315 and therefore the HLR 315 is "aware" of the associated between the destination device 305 and the registration server 314. Accordingly, the HLR 315 can send (332) the routing information associated with the destination device 305, which can be the routing number of the registration server 314.

Using the routing number, the SMSC 302 can send (333) the SMS message with the MSISDN of the destination device 305 to the registration server 314. The registration server 314 can examine the MSISDN to confirm (334) that there is an active product or service associated with the destination device 305. In particular, a user of the destination device 305 can have previously selected (e.g., on an in-flight trip), a service or product from a list of available services or products that may include various cellular connectivity options for the destination device 305 that are based on time durations, data limits, or other parameters. The registration server 314 can also retrieve (335) an SIP URI associated with the MSISDN of the destination device 305. In particular the SIP URI may have been previously associated with the MSISDN during the registration of the destination device 305 with the registration server 314.

The registration server 314 can convert (336) the SMS message into an SIP message using the SIP URI, according to various techniques or communication protocols (e.g., CDMA, GSM, etc.). The registration server 314 can also send (337) the SIP message with the SIP URI to the SBC/SIP server 327. According to embodiments, the SBC/SIP server 327 can establish (338) a TLS connection with the destination device 305 using a digital certificate or according to other techniques. Further, the SBC/SIP server 327 can send (342) the SIP message to the destination device 305 via the established TLS connection. The destination device 305 can present (343) the SIP message to a user of the destination device 305. In some embodiments, the destination device 305 can present the body or textual portion of the SIP message via an application installed on the destination device 305. After receiving the SIP message, the destination device 305 can send (339) a message received acknowledgement to the SBC/SIP server 327, which can be respectively forwarded to the registration server 314 (340) and to the originating device (310).

Figure 4:
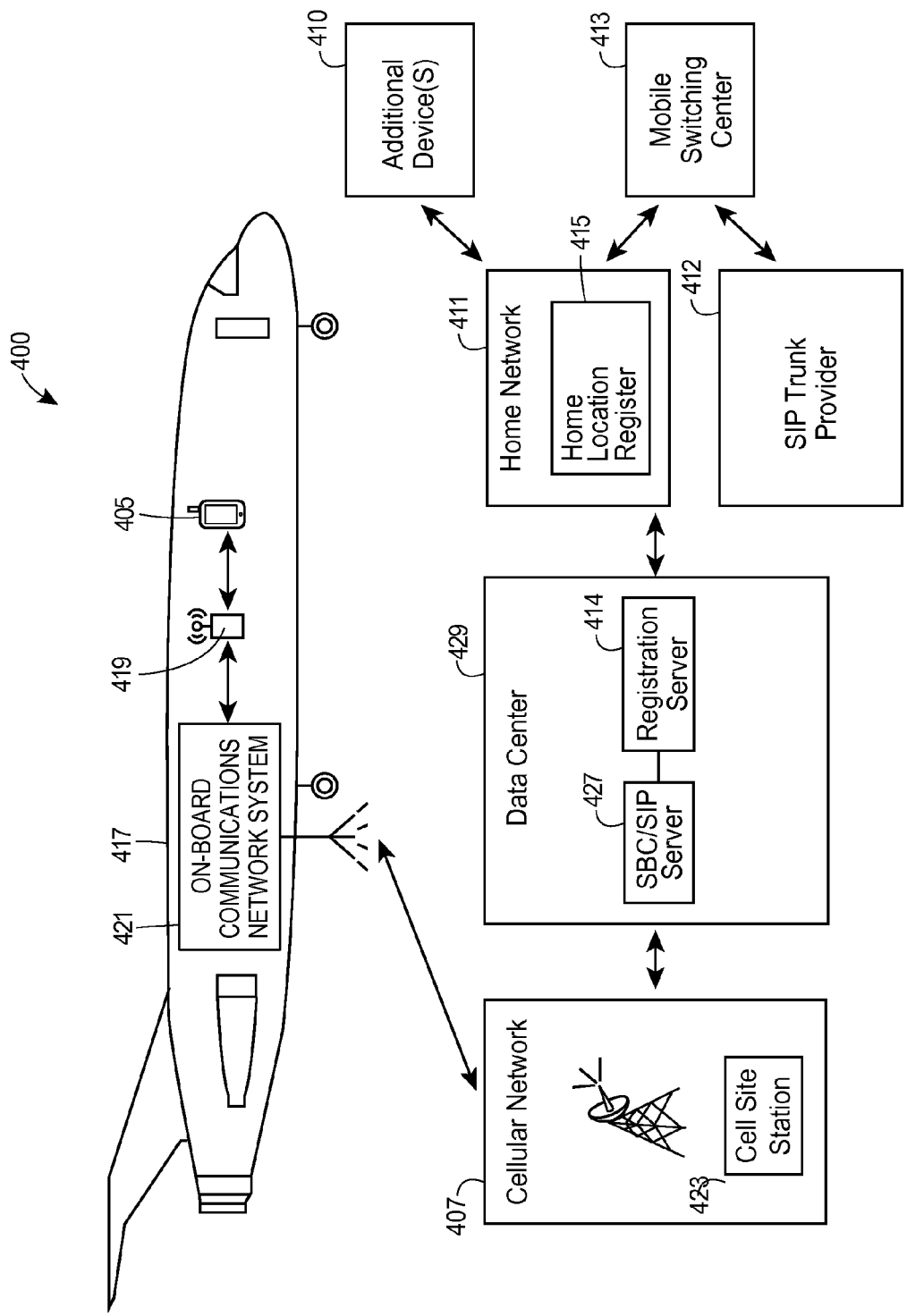
FIG. 4 illustrates an exemplary representation of electronic devices and components capable of facilitating voice-based communications between electronic devices, in accordance with some embodiments.

FIG. 4 illustrates an example representation 400 of components configured to facilitate cellular-based communications among electronic devices. In particular, the components of the representation 400 are configured to facilitate voice-based communications (e.g., VoIP calls) between an electronic device 405 connected to a non-terrestrial-based network and one or more additional devices 410 connected to a terrestrial-based network.

Similar to the electronic device 105 and the additional device 110 of FIG. 1, each of the electronic device 405 and the additional device 410 may be any type of standalone or portable electronic device capable of communicating via one or more networks. For example, each of the electronic device 405 and the additional device 410 may be a mobile phone, a Personal Digital Assistant (PDA), a smart phone, a tablet computer, a multimedia player, a desktop or notebook computer, an MP3 player, a digital broadcast receiver, or any other electronic apparatus. Each of the electronic device 405 and the additional device 410 may also have a subscription or plan with a cellular services provider, whereby the cellular services provider supports cellular communications conducted via the electronic device 405 and/or the additional device 410.

As illustrated in FIG. 4, the electronic device 405 is transported by or otherwise located within a vehicle 417, similar to the vehicle 117 as discussed with respect to FIG. 1. The vehicle 417 is equipped with a wireless access point 419 and an on-board communications network system 421. At any given moment in time, the on-board communications network system 421 may be in communicative connection with one or more data or communications networks that are disposed, managed, and/or hosted, for the most part (if not entirely), externally to the vehicle 417. For example, an external network may be a public, ground-based data or communications network, such as the Internet and/or the PSTN (Public Switched Telephone Network). The external network may also be a ground-based private data and/or communications network. Further, the external network may be a cellular network 407 that includes a cell site station 423. Typically, ground systems and ground computing devices may be essentially fixed in location, and base stations or infrastructure containing equipment via which devices may wirelessly access the ground system may be contained in one or more buildings or other structures that are fixedly attached to the ground or to earth.

The electronic device 405 can connect to the on-board communications network system 421 via the wireless access point 419. Generally, the on-board communications network system 421 may be disposed, managed, and/or hosted entirely on-board the vehicle 417. For example, the on-board communications network system 421 may be a Wi-Fi network that is contained and operated within the cabin of the vehicle 417. The on-board communications network system 421 may utilize any known communication protocol or combinations thereof, such as a wireless protocol, a wired protocol, other ARINC standard-compatible protocols, or a private protocol. In an example, the on-board communications network system 421 utilizes an IEEE 802.11 compatible protocol to communicate with the electronic device 405. In another example, the on-board communications network system 421 utilizes a hypertext transfer protocol (HTTP) and a Near Field Communications (NFC)-compatible protocol (e.g., Bluetooth®) to communicate with the electronic device 405.

The on-board communications network system 421 can also facilitate and manage communications between the electronic device 405 and the cell site station 423 of the cellular network 407. According to embodiments, the on-board communications network system 421 and the cell site station 423 may collectively make up an air-to-ground (ATG) communication network for aircraft use. In embodiments, the on-board communications network system 421 and the cell site station 423 can facilitate any type of data communication via any wireless standard or technology (e.g., GSM, CDMA, TDMA, WCDMA, LTE, EDGE, OFDM, GPRS, EV-DO, UWB, and others).

The cell site station 423 of the cellular network 407 can connect, via one or more various wired or wireless networks, to a ground-based data center 429 having components for securely facilitating communications between the electronic device 405 and other electronic devices, such as the additional device 410. In particular, the cell site station 423 includes a SBC/SIP server 427 (which may be separate servers or combined into the same server) and a registration server 414. The registration server 414 may include any combination of hardware and software elements configured to directly or indirectly communicate with the electronic device 405 and the additional device 410, and facilitate the functionalities and communications described herein. Further, the SBC/SIP server 427 can facilitate and manage communication sessions among the electronic device 405, the additional device(s) 4101, and the data center 429 using the SIP signaling communications protocol.

According to embodiments, the electronic device 405 can download and install a communication application (not shown in FIG. 1) that enables the cellular-based communications when the electronic device 405 is located in the vehicle 417. Further, the electronic device 405 can use the communication application to register and create an account with the registration server 414. The registration configures the electronic device 405 to communicate over various air-borne communication networks, such as an air-to-ground (ATG) communication network for aircraft use.

As illustrated in FIG. 4, the registration server 414 may connect, via a cellular-based network, to a home network 411 associated with the electronic device 405. The cellular-based network may be a wide area network (WAN) configured to facilitate any type of data communication via any standard or technology (e.g., GSM, CDMA, TDMA, WCDMA, LTE, EDGE, OFDM, GPRS, EV-DO, UWB, and others). Generally, the home network 411 of the electronic device 405 may be administered or provided by a cellular communications service provider with which the user (i.e., subscriber) of the electronic device 405 has an agreement to receive wireless communications services and features. Accordingly, the home network 411 of the electronic device 405 may administrate or manage an HLR 415 and/or a VLR (not shown in FIG. 4), among other databases or components, to support and manage cellular communication, roaming, and other features according to the services agreement. Additionally, the cellular radio frequency (RF) communications band utilized by the home network 411 to wirelessly communicate with mobile devices may be an RF band designated for AMPs, TDMA, CDMA, GSM, PCS, 3G, 4G, 5G, and/or any other terrestrial cellular radio frequency band. Generally, a cellular radio frequency band is a portion of RF spectrum that is allocated by a governmental agency or other body which governs the usage of spectrum. In some networks, more than one cellular RF band may be supported.

The HLR 415 can include a database that stores identifications of electronic devices that are authorized to communicate via the home network 411. In particular, for each authorized device, the HLR 415 can store the corresponding IMSI, which is a unique number that identifies each authorized device (or more particularly, identifies the SIM card of each authorized device). The HLR 415 can also pair each IMSI with an MSISDN that corresponds to a telephone number of the authorized device.

The data center 429 can further be configured to communicate with an SIP trunk provider 412. According to embodiments, the SIP trunk provider 412 enables VoIP and streaming media communications by which internet telephony service providers (ITSPs) deliver telephone services and unified communications to customers equipped for SIP-based communications. Each of the home network 411 and the SIP trunk provider 412 (as well as the data center 429) may communicate with a mobile switching center (MSC) 413. According to embodiments, the MSC 413 routes voice calls and other messaging services to and from end devices, such as the electronic device 405 and the additional device(s) 410. In particular, the MSC 413 sets up and releases end-to-end connections, and manages mobility and hand-over requirements during calls, among other services as known in the art.

According to embodiments, the components of the representation 400 are configured to facilitate voice-based communications between the electronic device 405 and the one or more additional devices 410. In one embodiment, the data center 429 can receive an SIP message initiated by the electronic device 405 traveling while in the vehicle 417, whereby the SIP message is intended to set up a voice communication with the additional device 410. Because the SIP message is initiated as an internet-based communication, the SIP message is not configured to set up a conventional telephone call with the additional device 410. Accordingly, the data center 429 can perform various techniques associated with the message, as well as leverage the SIP trunk provider 412 and the MSC 413, so that an RTP stream may be established between the electronic device 405 and the additional device 410 to facilitate the voice-based communication.

In another embodiment, the additional device 410 can initiate a voice-based communication intended for the electronic device 405. The SIP trunk provider 412 can initiate the voice-based communication setup by sending a message to the data center 429. The data center 429 can perform various techniques associated with the message, as well as leverage the cellular network 407, so that an RTP stream may be established between the electronic device 405 and the additional device 410 to facilitate the voice-based communication.

Figure 5:
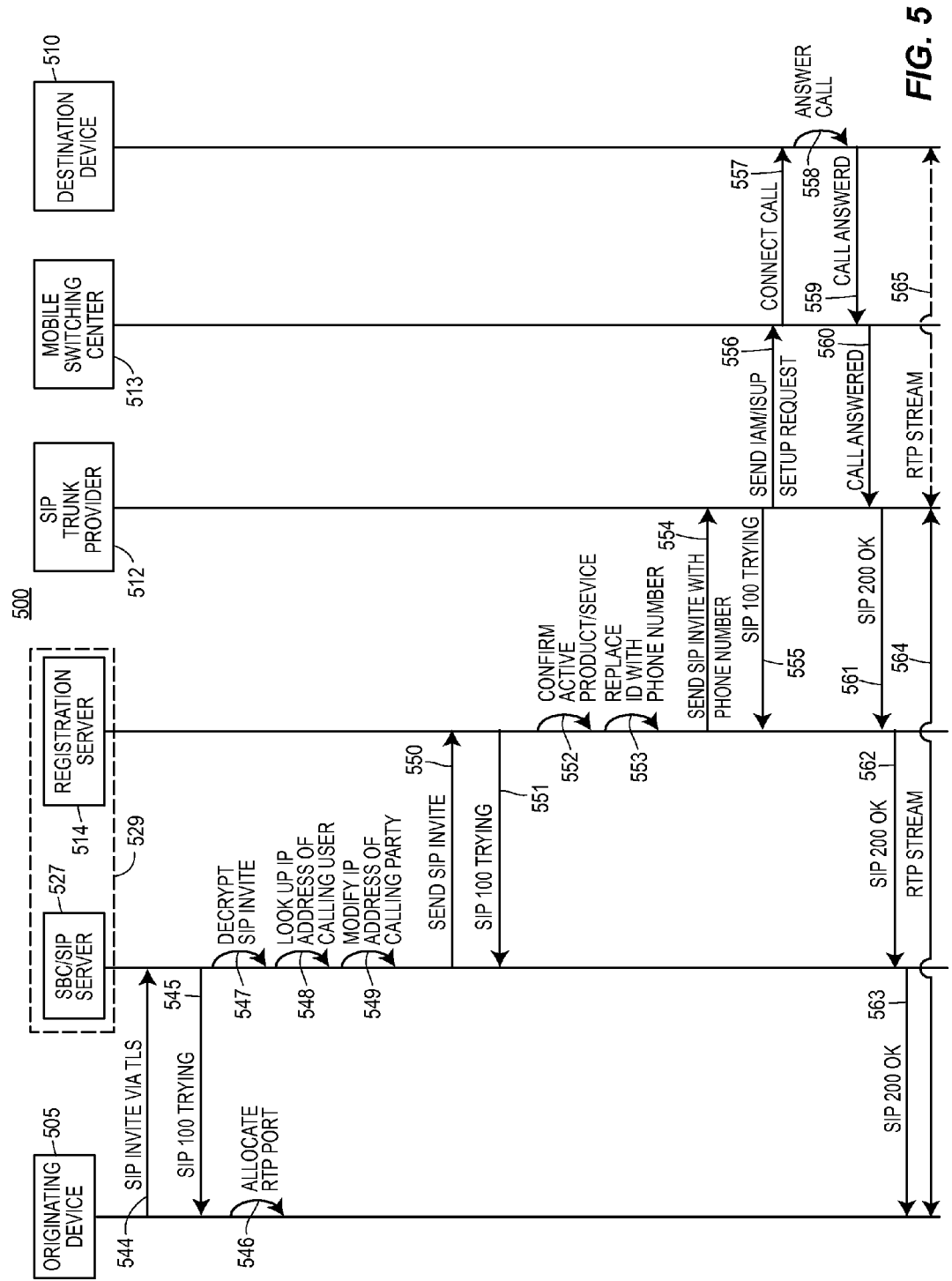
FIG. 5 depicts an example signal diagram associated with facilitating a voice-based communication that originates from an electronic device connected to a non-terrestrial network, in accordance with some embodiments.

FIG. 5 illustrates a signal diagram 500 associated with facilitating a voice-based communication that originates from an originating device 505 connected to a non-ground-based network, such as if the originating device 505 is located on board a vehicle such as an aircraft. The voice-based communication can be intended for a destination device 510 that is connected to a terrestrial-based network. According to embodiments discussed herein, the voice-based communication can be a VoIP call, however it should be appreciated that other voice-based communications are envisioned. The signal diagram 500 includes the originating device 505 (such as the electronic device 405 as discussed with respect to FIG. 4), a data center 529 including an SBC/SIP server 527 (such as the SBC/SIP server 427 as discussed with respect to FIG. 4) and a registration server 514 (such as the registration server 414 as discussed with respect to FIG. 4), an SIP trunk provider 512 (such as the SIP trunk provider 412 as discussed with respect to FIG. 4), a mobile switching center 513 (such as the mobile switching center 413 as discussed with respect to FIG. 4), and the destination device 510 (such as the additional device 410 as discussed with respect to FIG. 4). For purposes of discussion, it should be appreciated that the originating device 505 has already completed the registration procedure with the registration server 514, and has also purchased a product or service that enables voice-based communication via the non-ground-based network.

A user of the originating device 505 can use an application that is registered with the registration server 514 to initiate the voice-based communication (e.g., a VoIP call). In particular, the user can input an MSISDN (i.e., telephone number) associated with the destination device 510 and select to initiate the call. Although not illustrated in FIG. 5, the originating device 505 can establish a TLS connection with the SBC/SIP server 527, for example using a digital certificate obtained during registration with the registration server 514. The originating device 505 can send (544) an SIP invitation request associated with the VoIP call to the SBC/SIP server 527 via the TLS connection. The SIP invitation request can include an identification of the originating device 505, such as the IMSI of the originating device 505. The SBC/SIP server 527 can respond (545) to the originating device 505 with an SIP 100 trying message. Responsive to receiving the SIP 100 trying message, the originating device 505 can allocate (546) an RTP port and listen for a communication on the RTP port.

The SBC/SIP server 527 can decrypt (547) the SIP message and look up (548) the IP address associated with the originating device 505. In particular, the IP address can be a care-of address (CoA) that the SBC/SIP server 527 has previously associated with the originating device 505. The SBC/SIP server 527 can modify (549) the IP address of the originating device 505 by replacing the IP address included in the SIP message with the CoA associated with the originating device 505. After modifying the IP address, the SBC/SIP server 527 can send (550) the SIP invite message with the modified IP address to the registration server 514. The registration server 514 can examine the SIP invite message and confirm (552) that the originating device 505 has an active product or service. The registration server 514 can also replace (553) the identification of the originating device 505 (e.g., the IMSI of the originating device 505) that is specified in the SIP invite message with the phone number (e.g., MSISDN) associated with the originating device 505.

The registration server 514 can send (554) the SIP invite message with the phone number associated with the originating device 505 to the SIP trunk provider 512, and the SIP trunk provider 512 can respond (555) to the registration server 514 with an SIP 100 trying message. Responsive to receiving the SIP invite message from the registration server 514, the SIP trunk provider 512 can send (556) an initial address message/ISDN user part (IAM/ISUP) setup request to the mobile switching center 513, and the mobile switching center 513 can connect (557) the VoIP call with the destination device 510.

As illustrated in FIG. 5, a user of the destination device 510 can cause the destination device 510 to answer (558) the call, which triggers a call answered acknowledgement to be sent (559) to the mobile switching center 513. The mobile switching center 513 can forward (560) the call answered acknowledgement to the SIP trunk provider 512. Upon receiving the call answered acknowledgement, the SIP trunk provider 512 can send (561) an SIP 200 OK message to the registration server 514, which can forward (562) the SIP 200 OK message to the SBC/SIP server 527, and which can forward (563) the SIP 200 OK message to the originating device 505 to notify the originating device 505 that the destination device 510 has answered the call. An RTP stream can be established (564, 565) via which voice-based communications may be facilitated between the originating device 505 and the destination device 510.

Although not illustrated in FIG. 5, it should be appreciated that functionalities for handling other various voice-based communication scenarios are envisioned. In particular, if the destination device 510 does not answer the voice-based call, an SIP 480 No Response message may be relayed to the originating device 505. Further, the originating device 505 may cancel the call before the destination device 510 answers the call, in which case SIP cancel messages may be relayed to the various devices and components.

Figure 6:
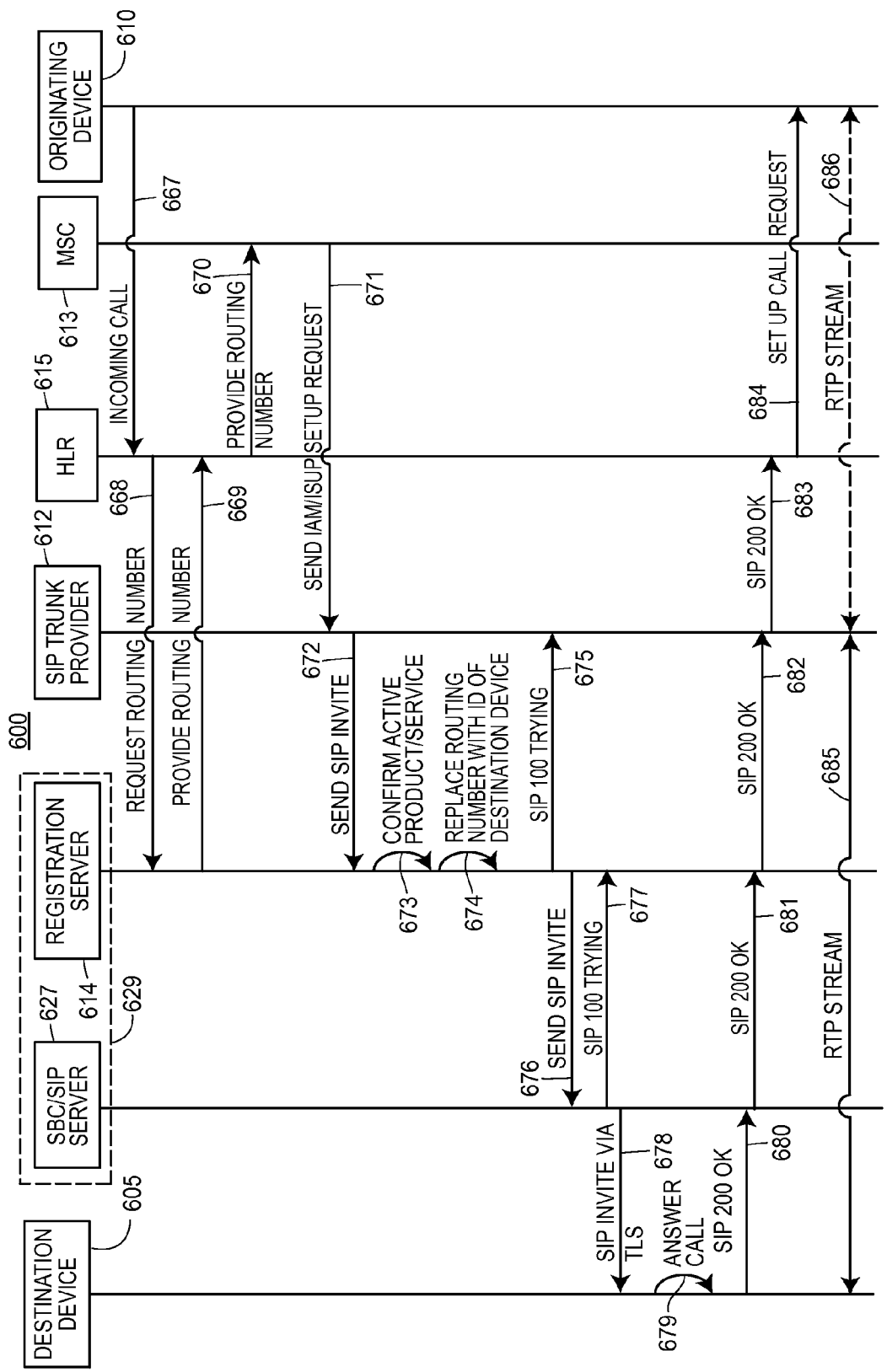
FIG. 6 depicts an example signal diagram associated with facilitating a voice-based communication that is intended for an electronic device connected to a non-terrestrial network, in accordance with some embodiments.

FIG. 6 illustrates a signal diagram 600 associated with facilitating a voice-based communication that originates from an originating device 610 connected to a terrestrial-based network. Further, the voice-based communication is intended for a destination device 605 that is connected to a non-terrestrial-based network, such as if the destination device 605 is located on board a vehicle such as an aircraft. According to embodiments discussed herein, the voice-based communication can be a VoIP call, however it should be appreciated that other voice-based communications are envisioned. The signal diagram 600 includes the destination device 605 (such as the electronic device 405 as discussed with respect to FIG. 4), a data center 629 including an SBC/SIP server 627 (such as the SBC/SIP server 427 as discussed with respect to FIG. 4) and a registration server 614 (such as the registration server 414 as discussed with respect to FIG. 4), an SIP trunk provider 612 (such as the SIP trunk provider 412 as discussed with respect to FIG. 4), an HLR 615 (such as the HLR 415 as discussed with respect to FIG. 4), a mobile switching center 613 (such as the mobile switching center 413 as discussed with respect to FIG. 4), and the originating device 610 (such as the additional device 410 as discussed with respect to FIG. 4). For purposes of discussion, it should be appreciated that the destination device 605 has already completed the registration procedure with the registration server 414, and has also purchased a product or service that enables voice-based communication via the non-terrestrial-based network.

A user of the originating device 610 can use the originating device 610 to initiate the voice-based communication (e.g., a VoIP call), for example via a telephone application. In particular, the user can input a telephone number associated with the destination device 605 and select to initiate the VoIP call. The originating device 610 can place (667) the VoIP call, which causes the originating device 610 to send a request to the HLR 615 associated with the destination device 605. The HLR 615 examines a destination of the call (i.e., the destination device 605) and can request (668) a routing number for the destination device 605 from the registration server 614. The registration server 614 can allocate a routing number for the destination device 605 and provide (669) the routing number to the HLR 615, which can forward (670) the routing number to the MSC 613. After receiving the routing number, the MSC 613 send (671) an IAM/ISUP setup request indicating the routing number to the SIP trunk provider 612.

The SIP trunk provider 612 can use the IAM/ISUP setup request to generate an SIP invite message that includes the routing number and send (672) the SIP invite message to the registration server 614. The registration server 614 can examine the SIP invite message and confirm (673) that the destination device 605 has an active product or service. In particular, a user of the destination device 605 can have previously selected (e.g., on an in-flight trip) a service or product from a list of available services or products that may include various cellular connectivity options for the destination device 605 that are based on time durations, data limits, or other parameters. The registration server 614 can also replace (674) the routing number specified in the SIP invite message with an identification associated with the destination device 605. In embodiments, the identification of the destination device 605 can be the IMSI of the destination device 605. The registration server 614 can send (676) the SIP invite message to the SBC/SIP server 627 and also send (675) an SIP 100 trying message to the SIP trunk provider 612.

According to embodiments, after receiving the SIP invite message, the SBC/SIP server 627 and the destination device 605 can establish a TLS connection according to various techniques, such as using a digital certificate previously issued to the destination device 605 during the registration procedure. Further, the SBC/SIP server 627 can send (678) the SIP invite message to the destination device 605 via the established TLS connection. A user of the destination device 605 can cause the destination device 605 to answer (679) the call, which causes the destination device to send (680) an SIP 200 OK message to the SBC/SIP server 627. The SBC/SIP server 627 can forward (681) the SIP 200 OK message to the registration server 614, which forwards (682) the SIP 200 OK message to the SIP trunk provider 612, which forwards (683) the SIP 200 OK message to the HLR 615, which sets up (684) a call request with the originating device 610. An RTP stream can be established (685, 686) via which voice-based communications may be facilitated between the originating device 610 and the destination device 605.

Although not illustrated in FIG. 6, it should be appreciated that functionalities for handling other various voice-based communication scenarios are envisioned. In particular, if the destination device 605 does not answer the voice-based call, an SIP 480 No Response message may be relayed to the originating device 610. Further, if the destination device 605 is busy, an SIP 486 Busy Here message may be relayed among the various devices and components.

In some embodiments, the voice data from the voice-based calls as described with respect to FIGS. 5 and 6 may be converted into text-based data. Generally, passengers of a vehicle such as an airplane may not want to overhear another passenger of the vehicle participating in a voice call. The passengers may further not want to hear the other party of the voice call on the electronic device of the participating passenger on the vehicle (e.g., via a speakerphone feature of the electronic device). Therefore, it may be desirable to convert voice data to text data for at least the participating passenger. Further, it may be desirable to limit the participating passenger's ability to actively participate in a voice call while traveling in the vehicle.

In cases in which a voice-based communication is established between a first device connected to a non-ground-based network and a second device connected to a ground-based network, the first device may enable the user to input text (e.g., via a on-screen keyboard, a peripheral keyboard, or another channel) instead of receiving audio (i.e., speech). The first device may include logic to convert the inputted text into speech, such as through a text-to-speech application as known in the art. Accordingly, the second device can receive the speech converted from the text via the data center and output the converted speech via an audio output component. Similarly, the second device may include logic to convert audio data (i.e., speech) received from the user into text, such as through a speech recognition (SR) application as known in the art. The second device can send the generated text to the data center which forwards the generated text to the first device. Accordingly, instead of outputting received audio data, the first device can present the text that the second device converted from the initial audio data. In some cases, the second device need not convert the audio data and the first device may still output the audio data instead of text, such as in cases in which the audio is output via an earpiece speaker of the first device or via a headset. In still further cases, the voice call may be facilitated as a one-way voice call whereby the first device outputs received audio but does not transmit audio back to the second device (e.g., by muting a microphone).

The audio and text conversion techniques may alternatively be facilitated by other components. In some cases, the on-board communications network system of the vehicle may include modules or applications to perform either or both of the text-to-voice conversion or the voice-to-text conversion. In other cases, the data center (or more particularly, the registration server) may include modules or applications to perform either or both of the text-to-voice conversion or the voice-to-text conversion.

Figure 7:
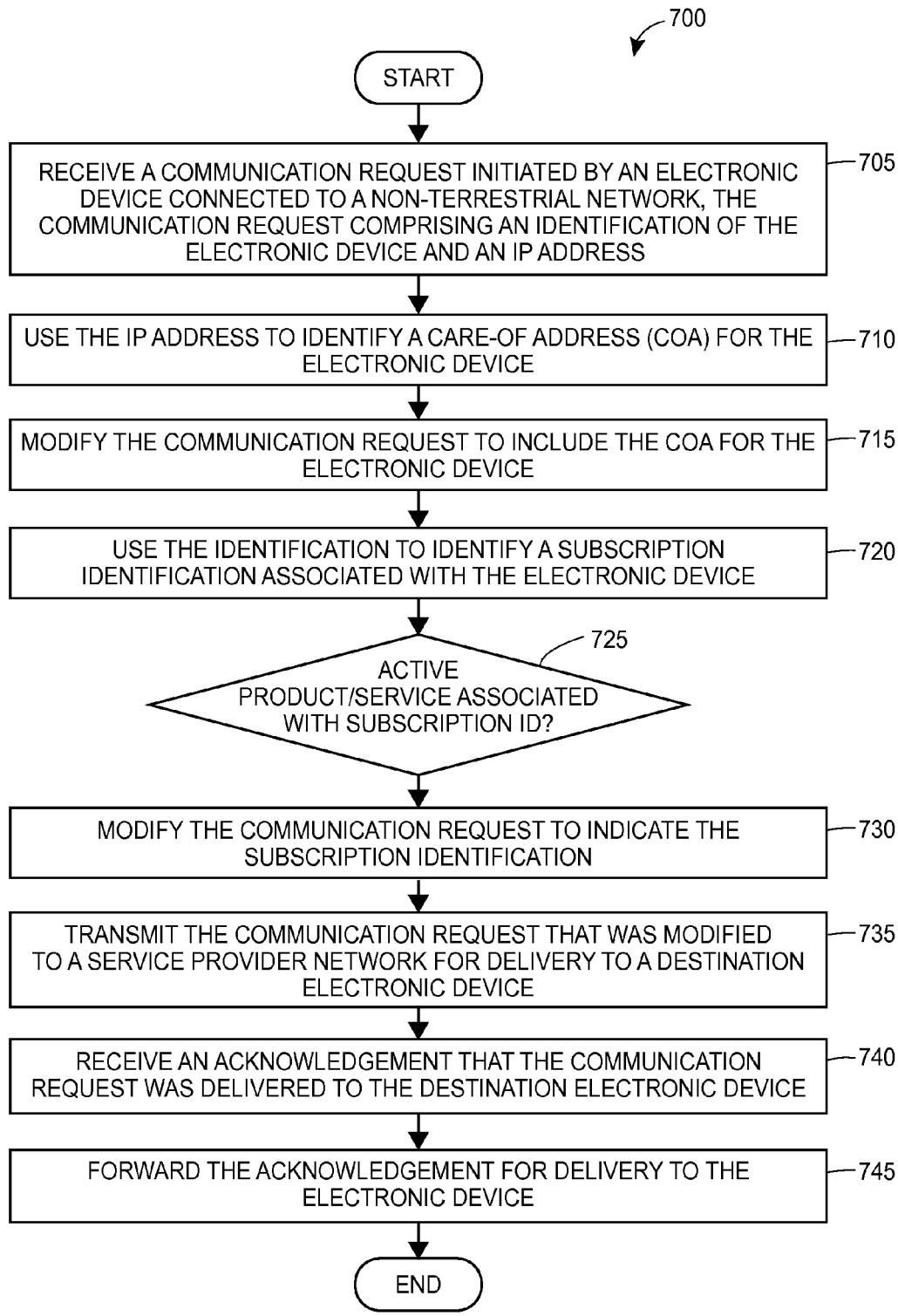
FIG. 7 depicts a flow diagram of a data center facilitating a communication that originates from an electronic device connected to a non-terrestrial network, in accordance with some embodiments.

FIG. 7 illustrates an example method 700 for facilitating a communication that is initiated by an electronic device connected to a non-terrestrial-based (i.e., air-based) communication network. According to embodiments, the communication may be a text-based communication (e.g., an SMS message) or a voice-based communication (e.g., a VoIP call). The method 700 may operate in conjunction with any or all portions of the systems, vehicles and/or electronic devices previously discussed with respect to FIGS. 1-6, or the method 700 may operate in conjunction with other suitable systems, vehicles, and/or electronic devices. In an embodiment, at least a portion of the method 700 may be performed by a data center including an SBC/SIP server and/or a registration server, such as the data center 129 as described with respect to FIG. 1 or the data center 429 as described with respect to FIG. 4.

At a block 705, the data center may receive a communication request initiated by an electronic device connected to a non-terrestrial network, where the communication request includes an identification of the electronic device as well as an IP address associated with the electronic device. In embodiments, if the communication corresponds to a text-based communication, the communication request may be a SIP message and the data center can be configured to convert the SIP message into an SMS message. In particular, the SIP message may include body text data, and the data center can convert the SIP message by appending the body text data to the SMS message. In other embodiments, if the communication corresponds to a voice-based communication, the communication request may be an internet-based voice communication request. According to embodiments, the identification of the electronic device may be an IMSI of the electronic device.

At a block 710, the data center may use the IP address received in the communication request to identify a care-of address (CoA) for the electronic device. Further, at a block 715, the data center may modify the communication request to include the CoA for the electronic device. In embodiments, the data center may maintain a database that associates the IP address of a particular electronic device with the CoA for that electronic device. At a block 720, the data center may use the identification of the electronic device to identify a subscription identification associated with the electronic device. According to embodiments, the data center can match the IMSI of the electronic device with an MSISDN number of the electronic device.

At a block 725, the data center may determine if there is an active product or service associated with the subscription identification. In embodiments, the active product or service may correspond to a service or product selected by the electronic device, for example various cellular connectivity options for the electronic device that are based on time durations, data limits, or other parameters. If there is no active product or service ("NO"), processing can end or proceed to other functionality.

If there is an active product or service ("YES"), processing can proceed to a block 730 at which the data center may modify the communication request to indicate the subscription identification. In embodiments, the data center can replace, in an origin field (or similar parameter) of the communication request, the IMSI with the MSISDN. Accordingly, when the communication is delivered to a destination electronic device, the communication can be presented in such a way that the communication appears as a cellular-based communication originating from the electronic device as if it was connected to a cellular-based network.

At a block 735, the data center can transmit the modified communication request to a service provider network for delivery to a destination electronic device. If the communication request corresponds to a voice-based communication request, the data center can transmit the modified voice-based communication request to an ITSP for delivery to the destination electronic device. If the communication request corresponds to an SIP message (and is converted into an SMS message), the data center can transmit the modified SMS message to an SMSC for delivery to the destination electronic device.

At a block 740, the data center may receive an acknowledgement that the communication request was delivered to the destination electronic device and, at a block 745, the data center may forward the acknowledgement for delivery to the electronic device. In some embodiments, the data center may send, via a TLS connection, an SIP 200 OK message for delivery to the electronic device. In some embodiments, if the communication corresponds to a voice-based communication, an RTP port can be established between the electronic device and the destination electronic device via which the voice-based communication may be facilitated.

Figure 8:
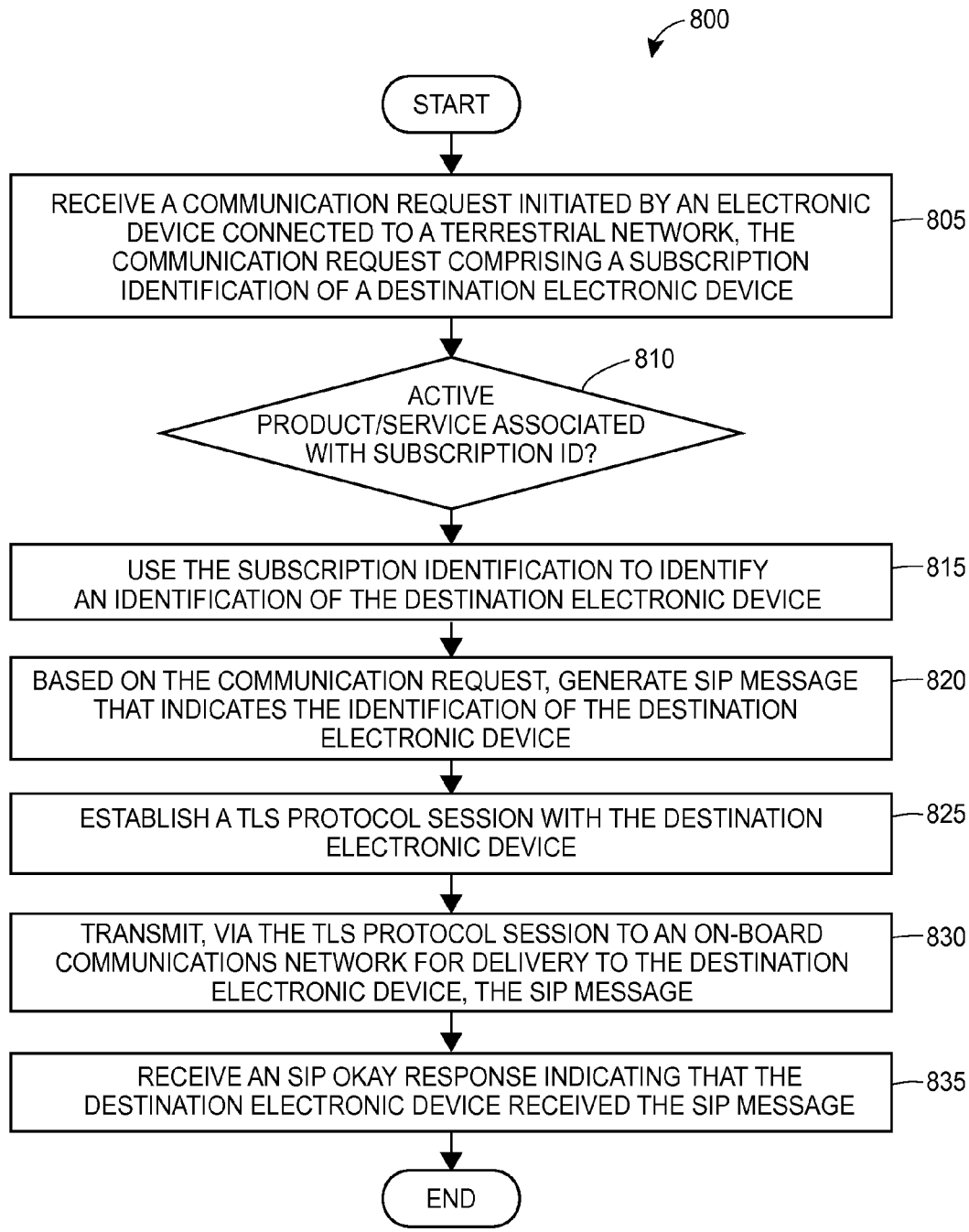
FIG. 8 depicts a flow diagram of a data center facilitating a communication that is intended for an electronic device connected to a non-terrestrial network, in accordance with some embodiments.

FIG. 8 illustrates an example method 800 for facilitating a communication that is intended for an electronic device connected to a non-terrestrial-based (i.e., air-based) communication network. Further, the communication may be initiated by an originating electronic device that is connected to a terrestrial-based network. According to embodiments, the communication may be a text-based communication (e.g., an SMS message) or a voice-based communication. The method 800 may operate in conjunction with any or all portions of the systems, vehicles and/or electronic devices previously discussed with respect to FIGS. 1-6, or the method 800 may operate in conjunction with other suitable systems, vehicles, and/or electronic devices. In an embodiment, at least a portion of the method 800 may be performed by a data center including an SBC/SIP server and/or a registration server, such as the data center 129 as described with respect to FIG. 1 or the data center 429 as described with respect to FIG. 4.

At a block 805, the data center may receive a communication request that is initiated by an electronic device connected to a terrestrial network, whereby the communication request includes a subscription identification of a destination electronic device. In some embodiments, if the communication corresponds to a voice-based communication, the data center may receive, from a service provider network associated with the destination electronic device, a request for a routing number that is associated with the destination electronic device. The data center can provide the routing number to the service provider network. Further, the communication request can be in the form of an SIP invite request from an SIP trunk provider via an MSC, wherein the SIP invite request includes the routing number. In other embodiments, if the communication corresponds to a text-based communication, the communication request may be an SMS message that is received from a SMSC. Further, the subscription identification of the electronic device that is received in the communication request may be an MSISDN of the destination electronic device.

At a block 810, the data center may determine if there is an active product or service associated with the subscription identification. In embodiments, the active product or service may correspond to a service or product selected by the destination electronic device, for example various cellular connectivity options for the destination electronic device that are based on time durations, data limits, or other parameters. If there is no active product or service ("NO"), processing can end or proceed to other functionality.

If there is an active product or service ("YES"), processing can proceed to a block 815 at which the data center may use the subscription identification to identify an identification of the destination electronic device. The identification of the destination electronic device may be an IMSI of the destination electronic device. At a block 820, the data center may generate an SIP message that indicates the identification of the destination electronic device. In some embodiments, if the communication request is received as an SMS message, the data center can convert the SMS message into an SIP message. In particular, the SMS message may include body text data, and the data center can convert the SMS message by appending the body text data to the SIP message. Further, the data center can retrieve an SIP URI associated with the MSISDN of the destination electronic device, and can include the SIP URI in the generated SIP message. In other embodiments, if the communication request corresponds to a voice-based communication, the data center can generate an SIP message that replaces the routing number corresponding to the destination electronic device with the IMSI of the destination electronic device.

At a block 825, the data center may establish a TLS protocol session with the destination electronic device. At a block 830, the data center may transmit, via the TLS protocol session to an on-board communications network for delivery to the destination electronic device, the SIP message. In some embodiments, if the communication request corresponds to a text-based communication, the data center can transmit the SIP message that includes the SIP URI to the on-board communication network for delivery to the destination electronic device. In other embodiments, if the communication request corresponds to a voice-based communication, the data center can transmit an SIP invite message to the on-board communications network for delivery to the destination electronic device. At a block 835, the data center may receive an SIP OKAY response indicating that the destination electronic device has received the SIP message. In some embodiments, if the communication corresponds to a voice-based communication, an RTP port can be established between the electronic device and the destination electronic device via which the voice-based communication may be facilitated.

Figure 9:
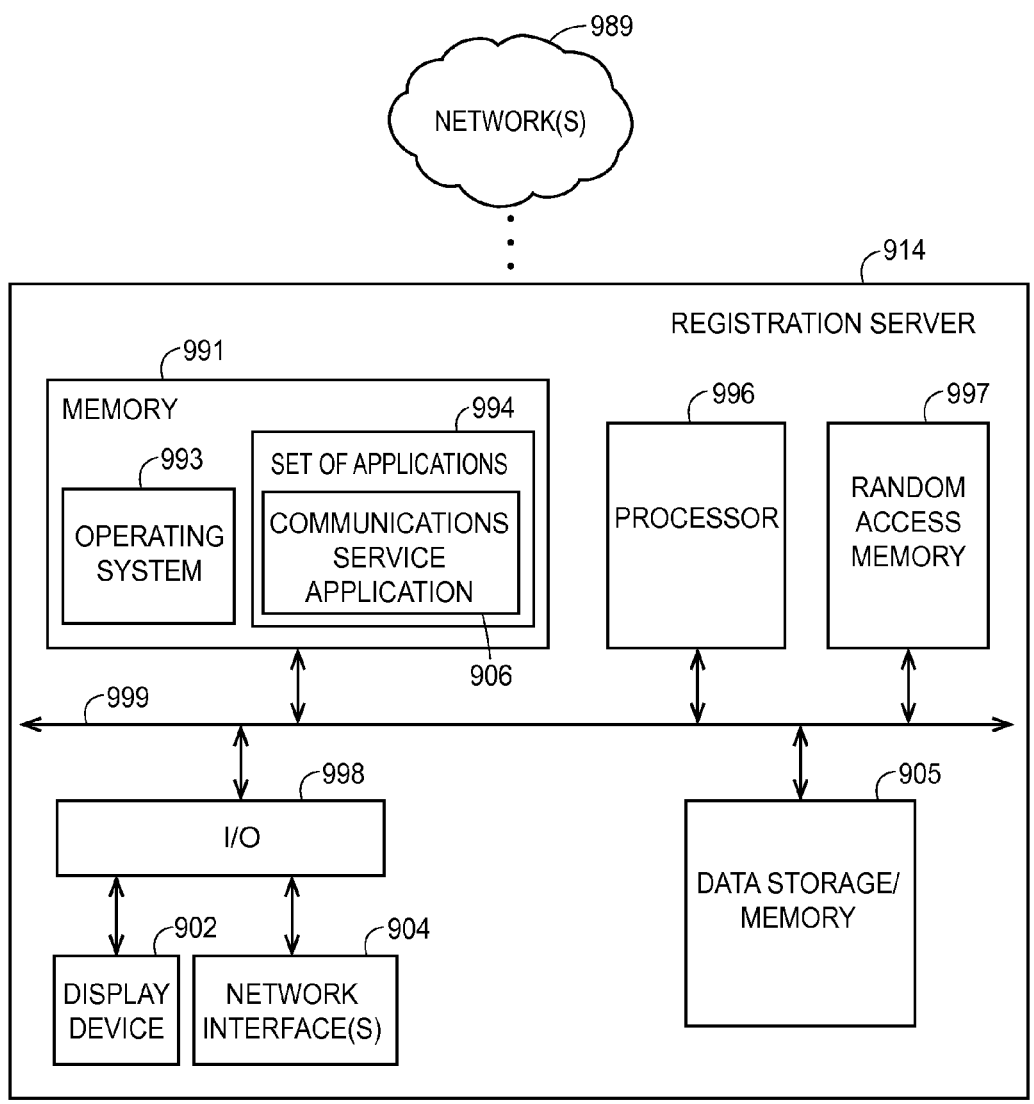
FIG. 9 is a block diagram of a registration server in accordance with some embodiments.

FIG. 9 illustrates a block diagram of an example registration server 914 which may operate in accordance with any of (and/or any one or more portions of) the systems, methods, techniques and concepts discussed herein. In an embodiment, the registration server 914 may be any of the registration servers 114, 214, 314, 414, 514, 614 as discussed with respect to FIGS. 1-6.

The registration server 914 may include a processor 996 (which may be called a controller, microcontroller or a microprocessor, in some embodiments) for executing computer-executable instructions, a program memory 991 for permanently storing data related to the computer-executable instructions, a random-access memory (RAM) or other suitable memory 997 for temporarily storing data related to the computer-executable instructions, and an input/output (I/O) circuit or component 998, all of which may be interconnected via an address/data bus or suitable bus 999. As used herein, the terms "computer-executable instructions," "computer executable instructions," and "instructions" are used interchangeably.

The registration server 914 may include one or more network interfaces 904 via which the registration server 914 may wirelessly connect with one or more respective networks 989 or devices. Generally, the network interfaces 904 enable the registration server 914 to connect to devices and entities over respective cellular radio frequency (RF) bands, e.g., AMPs, TDMA, CDMA, GSM, PCS, 3G, 4G, 5G, and/or any other terrestrial cellular radio frequency band. For example, the registration server 914 may communicate with an electronic device via a terrestrial base station or small cell using one of the network interfaces 904. Generally, the term "cellular radio frequency band," as used herein, refers to a portion of RF spectrum that is allocated by a governmental agency or other body which governs the usage of spectrum. The one or more network interfaces 904 may enable the registration server 914 to communicate over one or more cellular radio frequency bands (e.g., in terrestrial environments), and may include one or more corresponding transceivers. Although not shown in FIG. 9, the registration server 914 may also include one or more wireless network interfaces that enable the registration server 914 to communicate via non-cellular-based networks, such as local area networks.

With further regard to FIG. 9, it should be appreciated that although only one processor 996 is shown, the registration server 914 may include multiple processors 996. Similarly, the memory of the registration server 914 may include multiple RAMs (Random Access Memories) 997, multiple program memories 991, and/or one or more other data storage entities or types of memories 905. The RAM(s) 997, program memories 991, and/or the data storage entities 905 may be implemented as one or more semiconductor memories, magnetically readable memories, optically readable memories, biological memories, and/or other tangible, non-transitory computer-readable storage media, for example.

Furthermore, the I/O circuit 998 may connect to a display device 902. For example, the display device 902 may enable a user or administrator of the registration server 914 to manage the communication facilitation. The registration server 914 may also include other elements common to general purpose computing devices (not shown).

The memory 991 can store an operating system 993 capable of facilitating the functionalities as discussed herein. The processor 996 can interface with the memory 991 to execute the operating system 993, as well as execute a set of applications 994 comprising computer-executable electronic instructions for facilitating various registration and communication facilitation features. In particular, the set of applications 994 can include a communications service application 906 configured to facilitate text- and voice-based communications discussed herein. It should be appreciated that other applications are envisioned.

In some embodiments, the computer-executable instructions for the set of applications 994 may be configured to cause the registration server 914 to perform one or more portions of one or more of the methods described herein. The computer-executable instructions may be stored on a tangible, non-transitory computer-readable storage medium, such as on the memory 991 or on some other suitable memory. Furthermore, the computer-executable instructions may be executable by the one or more processors 996. The computer-executable instructions may be downloaded or otherwise delivered to the registration server 914.

Figure 10:
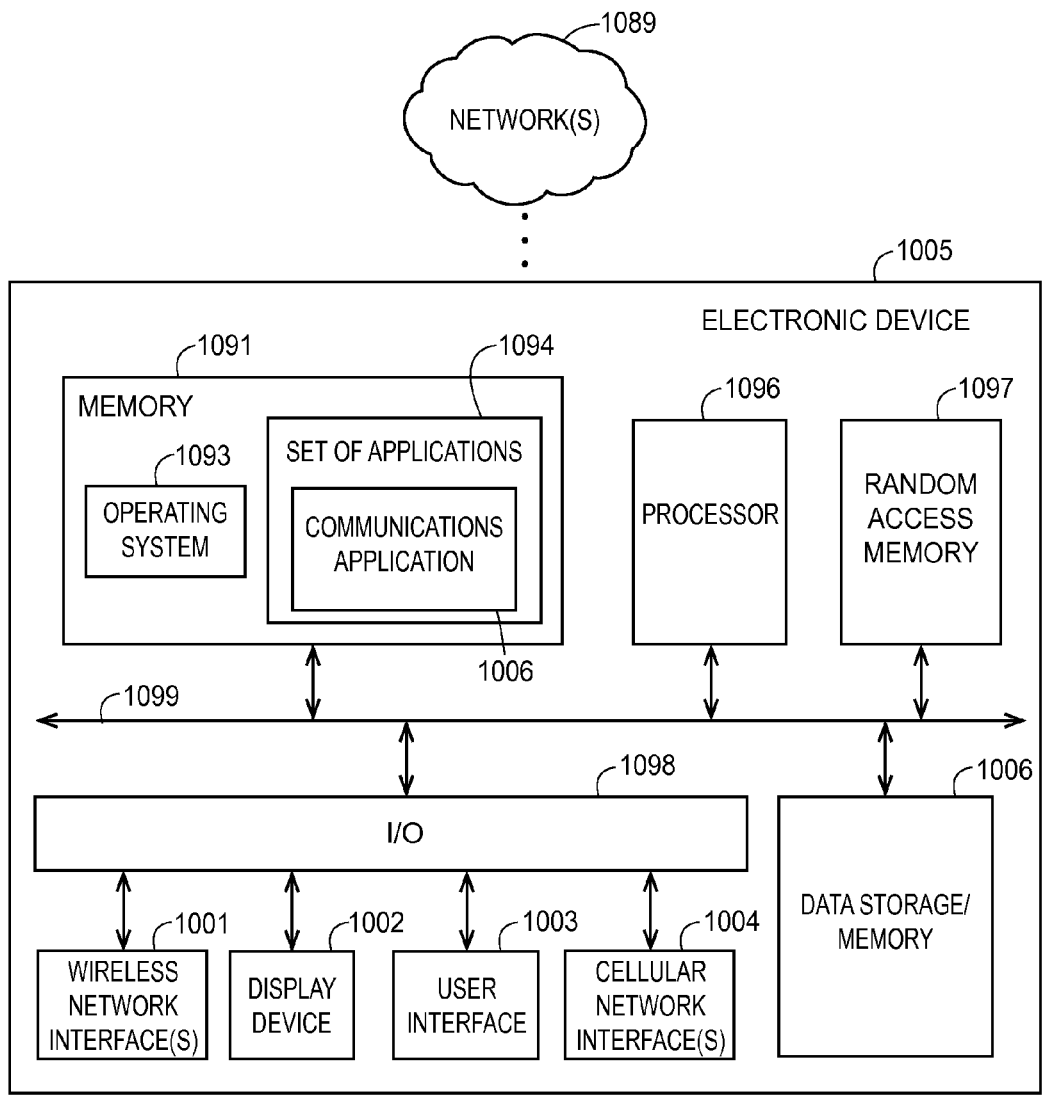
FIG. 10 is a block diagram of an electronic device in accordance with some embodiments.

FIG. 10 illustrates a block diagram of an example electronic device 1005 which may operate in accordance with any of (and/or any one or more portions of) the systems, methods, techniques and concepts discussed herein. The electronic device 1005 may be, for example, a smart phone, a smart device, a laptop, a tablet, an electronic reading device, or any other communications or computing device that is configured to communicate wirelessly. In an embodiment, the electronic device 1005 may be the any of the electronic devices 105, 205, 305, 405, 505, 605 (or any of the additional devices 110, 210, 310, 410, 510, 610) as described with respect to FIGS. 1-6.

The electronic device 1005 may include a processor 1096 (which may be called a controller, microcontroller or a microprocessor, in some embodiments) for executing computer-executable instructions, a program memory 1091 for permanently storing data related to the computer-executable instructions, a random-access memory (RAM) or other suitable memory 1097 for temporarily storing data related to the computer-executable instructions, and an input/output (I/O) circuit or component 1098, all of which may be interconnected via an address/data bus or suitable bus 1099. As used herein, the terms "computer-executable instructions," "computer executable instructions," and "instructions" are used interchangeably.

The electronic device 1005 may include one or more wireless network interfaces 1001 via which the electronic device 1005 may wirelessly connect with one or more networks 1089 or devices. In an embodiment, the one or more wireless network interfaces 1001 enable the electronic device 1005 to wirelessly connect to one or more other networks or devices that are included or contained in a terrestrial or a non-terrestrial environment. For example, the electronic device 1005 may communicatively connect to a non-terrestrial, local network (e.g., a non-terrestrial wireless Local Area Network (LAN) hosted on-board a vehicle) using a wireless Ethernet protocol over one of the wireless network interfaces 1001. Additionally or alternatively, the electronic device 1005 may communicatively connect to a local wireless network or device using a Near Field Communications (NFC) protocol (e.g., Bluetooth) over one of the wireless network interfaces 1001. Generally, the one or more wireless network interfaces 1001 may support any radio frequency band other than cellular radio frequency bands, and the one or more wireless network interfaces 1001 may include one or more corresponding transceivers. In an embodiment, the wireless network interfaces 1001 communicates with a wireless access point (such as a wireless access point on an airplane), which allows the electronic device 1005 to connect to an on-board network.

The electronic device 1005 may further include one or more cellular wireless interfaces 1004 to support communications over respective cellular radio frequency (RF) bands, e.g., AMPs, TDMA, CDMA, GSM, PCS, 3G, 4G, 5G, and/or any other terrestrial cellular radio frequency band. For example, the electronic device 1005 may communicate with a terrestrial base station or small cell using one or the cellular network interfaces 1004. Further, the electronic device 1005 may communicate with a registration server (such as the registration server 914 as described with respect to FIG. 9) over a WAN using one of the cellular network interfaces 1004. Generally, the term "cellular radio frequency band," as used herein, refers to a portion of RF spectrum that is allocated by a governmental agency or other body which governs the usage of spectrum. The cellular network interfaces 1004 may allow the electronic device 1005 to communicate over one or more cellular radio frequency bands (e.g., in terrestrial environments), and may include one or more corresponding transceivers. In an embodiment, the one or more cellular network interfaces 1004 are not used by the electronic device 1005 to communicate in non-terrestrial environments. In an embodiment, the one or more wireless network interfaces 1001 and the one or more cellular network interfaces 1004 may each be independently activated and deactivated.

With further regard to FIG. 10, it should be appreciated that although only one processor 1096 is shown, the electronic device 1005 may include multiple processors 1096. Similarly, the memory of the electronic device 1005 may include multiple RAMs (Random Access Memories) 1097, multiple program memories 1091, and/or one or more other data storage entities or types of memories 1006. The RAM(s) 1097, program memories 1091, and/or the data storage entities 1006 may be implemented as one or more semiconductor memories, magnetically readable memories, optically readable memories, biological memories, and/or other tangible, non-transitory computer-readable storage media, for example.

Furthermore, although the I/O circuit 1098 is shown as a single block, it should be appreciated that the I/O circuit 1098 may include a number of different types of I/O circuits or connections. For example, a first I/O circuit may correspond to a display device 1002, and the first or a second I/O circuit may correspond to a user interface 1003. The user interface 1003 in combination with the display device 1002 may include various I/O components (e.g., capacitive or resistive touch sensitive input panels, keys, buttons, lights, LEDs, cursor control devices, haptic devices, and others). In embodiments, the display device 1002 may be a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like. The user interface 1003 may further include audio components such as a microphone and/or a speaker. The electronic device 1005 may also include other elements common to general purpose computing devices (not shown).

The memory 1091 can store an operating system 1093 capable of facilitating the functionalities as discussed herein. The processor 1096 can interface with the memory 1091 to execute the operating system 1093 as well as execute a set of applications 1094 comprising computer-executable electronic instructions for facilitating various registration features. In particular, the set of applications 1094 can include a communication application 1006 configured to facilitate the communications as discussed herein. For example, the communication application 1006 can initiate and receive text- and voice-based communications. It should be appreciated that other applications are envisioned, such as a dedicated SMS messaging application.

In some embodiments, the computer-executable instructions for the set of applications 1094 may be configured to cause the electronic device 1005 to perform one or more portions of one or more of the methods described herein. The computer-executable instructions may be stored on a tangible, non-transitory computer-readable storage medium, such as on the memory 1091 or on some other suitable memory. Furthermore, the computer-executable instructions may be executable by the one or more processors 1096. The computer-executable instructions may be downloaded or otherwise delivered to the electronic device 1005.

Of course, the applications and benefits of the systems, methods and techniques described herein are not limited to only the above examples. Many other applications and benefits are possible by using the systems, methods and techniques described herein.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A method of processing, by a registration server, communication requests intended for a destination electronic device connected to an on-board communications network of a vehicle, the method comprising:
    receiving a communication request that is (1) initiated by an electronic device connected to a terrestrial network and (2) intended for the destination electronic device, the communication request including a short message service (SMS) message and a subscription identification associated with the destination electronic device;
    determining, based on the subscription identification of the destination electronic device, that there is an active product or service associated with communications capability of the destination electronic device on the vehicle;
    in response to the determining, retrieving a Uniform Resource Identifier (URI) that was previously associated with the subscription identification of the destination electronic device during a registration by the destination electronic device with the registration server;
    converting the SMS message into a Session Initiation Protocol (SIP) message using the URI of the destination electronic device; and
    transmitting, to the on-board communications network for delivery to the destination electronic device, the SIP message.

2. The method of claim 1, wherein the short message service (SMS) message comprises body text data, and wherein converting the SMS message into the SIP message comprises:
    appending the body text data to the SIP message, wherein the body text data is configured to be presented to a user of the destination electronic device.

3. The method of claim 1, wherein the identification of the destination electronic device is an international mobile subscriber identify (IMSI) and the subscription identification is a mobile subscriber integrated services for digital network (MSISDN) number.

4. The method of claim 1, wherein transmitting the SIP message comprises:
    establishing a transport layer security (TLS) protocol session with the destination electronic device; and
    transmitting the SIP message via the TLS protocol session.

5. The method of claim 1, wherein the communication request is a voice communication request, and wherein the method further comprises:
    receiving, from a service provider network associated with the destination electronic device, a request for a routing number; and
    providing the routing number to the service provider network.

6. The method of claim 5, wherein receiving the communication request
    receiving a session initiation protocol (SIP) invite request from an SIP trunk provider via a mobile switching center (MSC), wherein the SIP invite request comprises the routing number.

7. The method of claim 6, wherein the identification of the destination electronic device is an international mobile subscriber identify (IMSI), and wherein modifying the communication request to indicate the identification of the destination electronic device comprises:
    replacing, in a destination field of the communication request, the routing number with the IMSI.

8. The method of claim 6, wherein transmitting, to the destination electronic device, the communication according to the communication request that was modified comprises:
    forwarding the session initiation protocol (SIP) invite request to the on-board communications network for delivery to the destination electronic device; and
    receiving an SIP okay response from the on-board communications network, the SIP okay response indicating that a user of the destination electronic device has accepted the SIP invite request.

9. A system for processing communication requests intended for a destination electronic device connected to an on-board communications network of a vehicle, comprising:
    a communication module configured to send and receive data; and
    a data center comprising a memory and a processor, and communicatively connected to the communication module, wherein the data center is configured to:
        receive, via the communication module, a communication request that is (1) initiated by an electronic device connected to a terrestrial network and (2) intended for the destination electronic device, the communication request comprising a subscription identification associated with the destination electronic device,
        determine, based on the subscription identification of the destination electronic device, that there is an active product or service associated with communications capability of the destination electronic device on the vehicle,
        in response to the determining, retrieve a Uniform Resource Identifier (URI) that was previously associated with the subscription identification of the destination electronic device during a registration by the destination electronic device with the registration server, convert the SMS message into a Session Initiation Protocol (SIP) message using the URI of the destination electronic device, and transmit, to the on-board communications network via the communication module for delivery to the destination electronic device, the SIP message.

10. The system of claim 9, wherein the short message service (SMS) message comprises body text data, and wherein the data center is further configured to:

append the body text data to the SIP message, wherein the body text data is configured to be presented to a user of the destination electronic device.

11. The system of claim 9, wherein the identification of the destination electronic device is an international mobile subscriber identify (IMSI) and the subscription identification is a mobile subscriber integrated services for digital network (MSISDN) number.

12. The system of claim 9, wherein the data center is further configured to:

establish a transport layer security (TLS) protocol session with the destination electronic device, and transmit the SIP message via the TLS protocol session.

13. The system of claim 9, wherein the communication request is a voice communication request, and wherein the data center is further configured to:

receive, via the communication module from a service provider network associated with the destination electronic device, a request for a routing number, and provide the routing number to the service provider network.

14. The system of claim 13, wherein the communication request is a session initiation protocol (SIP) invite request, wherein the data center receives the SIP invite request from an SIP trunk provider via a mobile switching center (MSC), and wherein the SIP invite request comprises the routing number.

15. The system of claim 14, wherein the identification of the destination electronic device is an international mobile subscriber identify (IMSI), and wherein the data center is further configured to:

replace, in a destination field of the communication request, the routing number with the IMSI.

16. The system of claim 14, wherein the data center is further configured to:

forward the session initiation protocol (SIP) invite request to the on-board communications network for delivery to the destination electronic device, and receive an SIP okay response from the on-board communications network, the SIP okay response indicating that a user of the destination electronic device has accepted the SIP invite request.

* * * * *